(12) United States Patent  
Anslot et al.

(10) Patent No.: US 10,187,786 B2
(45) Date of Patent: *Jan. 22, 2019

(54) SYSTEM AND METHOD FOR HANDLING INACTIVE SIM CARDS

(71) Applicant: GEMALTO SA, Meudon (FR)

(72) Inventors: Michel Anslot, Mougins (FR); Philippe Bouckaert, Biot (FR); Jean-Rene Bouvier, Biviers (FR)

(73) Assignee: GEMALTO SA, Meudon (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/120,333

(22) PCT Filed: Feb. 23, 2015

(86) PCT No.: PCT/EP2015/053762
§ 371 (c)(1),
(2) Date: Aug. 19, 2016

(87) PCT Pub. No.: WO2015/124782
PCT Pub. Date: Aug. 27, 2015

(65) Prior Publication Data
US 2017/0070878 A1    Mar. 9, 2017

(30) Foreign Application Priority Data

Feb. 21, 2014 (EP) .................................... 14305246
Jun. 6, 2014 (EP) .................................... 14171611

(51) Int. Cl.
*H04W 4/00* (2018.01)
*H04W 8/20* (2009.01)
*H04W 8/04* (2009.01)
*H04W 8/24* (2009.01)
*H04W 84/04* (2009.01)

(52) U.S. Cl.
CPC ............ *H04W 8/205* (2013.01); *H04W 8/04* (2013.01); *H04W 8/24* (2013.01); *H04W 84/042* (2013.01)

(58) Field of Classification Search
CPC ....... H04W 60/00; H04W 60/04; H04W 8/18; H04W 8/12; H04B 1/3816; H04M 2250/14
See application file for complete search history.

(56) References Cited

U.S. PATENT DOCUMENTS

2006/0058028 A1* 3/2006 Allison ................ H04M 15/90
                                                          455/435.1
2010/0210306 A1   8/2010 Larsson
2013/0252584 A1   9/2013 Cuadrat et al.

FOREIGN PATENT DOCUMENTS

| EP | 1942692 A1 | 7/2008 | |
| EP | 2 280 566 | * 2/2011 | ............. H04W 8/18 |
| WO | WO 2004/028191 | * 4/2004 | ............. H04Q 7/38 |
| WO | 2012015366 A1 | 2/2012 | |

OTHER PUBLICATIONS

International Search Report for corresponding International PCT application No. PCT/EP2015/053762, dated Jun. 15, 2015.

* cited by examiner

*Primary Examiner* — Stephen M D Agosta
(74) *Attorney, Agent, or Firm* — Hauptman Ham, LLP

(57) ABSTRACT

A method in a cellular communication network comprising the steps of: marking a SIM card as inactive when said SIM card has not been used for at least a quarantine duration, provisioning a recycler node by backing up managing parameters related to said inactive SIM card, in a database.

30 Claims, 11 Drawing Sheets

SYSTEM AND METHOD FOR HANDLING INACTIVE SIM CARDS

The technical domain of the invention is the domain of cellular communication network management. More precisely it concerns the management of SIM card that have not been activated for a long time period.

In a cellular communication network a SIM card is associated to a subscription and allows a subscriber to use a terminal so as to connect to the cellular communication network and to use its communication services, such as voice calls, text messaging etc.

After a SIM card has been initialized, during a first attachment to the cellular communication network, said SIM card is known to the cellular communication network. Consequently some managing nodes in the cellular communication network, further named "relevant managing nodes", are provisioned so as to dedicate some of their memory resources to store "managing parameters" associated to said SIM card.

Said managing parameters are specific to said SIM card and are necessary to manage an attachment of said SIM card to the cellular communication network and the delivery of communication services. Among those managing parameters are: the International Mobile Subscriber Identifier (IMSI), the encryption key (Ki) and the Mobile Station Integrated Services Digital Network Number (MSISDN). The Home Location Register (HLR) for GSM or EDGE networks or the Home Subscriber Server (HSS) for LTE or UMTS networks is an example of relevant managing nodes. In the following description the term HLR/HSS will be used to encompass either a HLR or a HSS in function of the network wherein the invention is implemented.

Each SIM card provisioned in a network occupies storage resources and costs money to the cellular communication network operator.

National regulations generally allow cellular communication network operators to inactivate a SIM card and to de-provision relevant managing nodes by removing all records relating to said SIM card and the associated subscription and to reallocate the phone number, also referred to by the acronym MSISDN, after a given minimum quarantine duration has elapsed without said SIM card being used. Said quarantine duration most often counts in months, e.g. six months. The quarantine duration most often lasts between 30 days and 352 days. This means that, depending of the operators and national regulations, the SIM card can be considered as inactive after only 30 days of absence of activity in some countries, while in some other countries, the operator must wait 352 after the last activity of the cellular terminal before considering the SIM card as inactive. More often the quarantine duration lasts between 30 days and 180 days. Said inactivation is final and the SIM card can be thrown away.

Therefore, the SIM lifetime is limited, which represents a cost for the operator which can be compounded by high customer churn rates. Some customers change their operator and therefore their SIM card frequently and often in function of the release of attractive commercial offers from operators. As the customers tend to change their SIM card more frequently than before, the SIM lifetime has turned out to decrease significantly and the operator must order more SIM cards for no visible revenue growth.

The document U.S. Pat. No. 2010/210306 provides a solution to re-activate a SIM card that has been de-activated while the cellular phone was attached to the network. To achieve that aim, this solution of U.S. Pat. No. 2010/210306 relies on a temporary IMSI ("IMSI-T") that is sent to the SIM card before during the de-activation phase and that replaces the previous IMSI of the SIM card.

One important drawback of this solution is that the cellular phone must be attached to the network during the during the de-activation phase.

A problem of the present invention is to propose a solution to limit the waste of SIM cards that have not been used for a period of time that exceeds the quarantine duration while also limiting the storage network resources occupied by inactive SIM cards and while limiting at least some drawbacks of the above mentioned solutions.

To achieve this aim, according to an embodiment, the invention describes a method in a cellular communication network comprising at least a home location register/home subscriber server (HLR/HSS) that stores managing parameters related to a SIM card associated to a cellular terminal configured to be connected to the network, said managing parameters comprising at least an International Mobile Subscriber Identifier (IMSI), and at least a routing node configured to route requests between the cellular terminal and the HLR/HSS, wherein:

the method comprises at least a step of provisioning a recycler node which comprises backing up in at least a database of said recycler node said managing parameters comprising said IMSI when said SIM card has not been used for at least a quarantine duration the method performs the following steps:

de-provisioning at least the HLR/HSS by removing from the HLR/HSS an identifier of a subscription (MSISDN 19) associated to the SIM card; the method also comprises the following steps performed when said SIM card has not been used for at least the quarantine duration:

sending any attachment request emanating from said SIM card to the recycler node, which comprises associating, in the routing tables of the routing node, the IMSI of said inactive SIM card with an address of said recycler node;

after the provisioning of the recycler node, after the de-provisioning of at least the HLR/HSS and upon reception at the recycler node of an attachment request emanating from said SIM card, the method comprises reactivating the SIM card through performing the following steps:

re-provisioning (26) at least the HLR/HSS by associating in the HLR/HSS the set of managing parameters related to said reactivated SIM card restored from the database with a new identifier of a subscription (new MSISDN 19), the set of managing parameters comprising said IMSI.

Therefore, the invention allows reusing a deactivated SIM card which is cost saving for operators.

In addition, the invention allows reactivating a de-activated SIM card, which allows for instance a subscriber to easily go back to his previous operator without buying a new SIM card. The customer does not need to go to a SIM card retailer and can launch the reactivation process simply through switching on its cellular terminal associated to the de-activated SIM card.

The invention overcomes the barrier that often deters a customer to return to its former operator.

In case the method performs the identification process, then the invention brings another advantage over the prior art solutions. Indeed, with these known solutions, when a customer wants to use the operator of the de-activate SIM card, he has to start over the entire identification that allow activating a SIM card for the first time. In many countries, depending on the national regulations, this activation process takes several days and requires many communications between the customer and the official agency in charge of enabling the activation. For instance, the customer has to supply the official agency with certified proof of identity and of residence and the official agency has to verify the validity of these documents. This represents an important burden for official administrations.

The invention alleviates the need for starting over the initial activation process while verifying that the user who wants to re-activate the de-activated SIM card is actually the person who initially obtained the activation allowance for the first activation of the SIM card.

The security of the process is therefore maintained while removing a useless additional identification process. The customer is not any more discouraged to return to its former operator.

Advantageously, the de-activation process can be completed while the cellular terminal is not attached to the network and while enabling a subsequent reactivation. Thus the invention does not need the cellular terminal to be attached to the network in order to allow the de-activation and a further activation Indeed, the method does not need to replace the IMSI of the SIM card by another IMSI such as a temporary IMSI. All the de-activation can be performed while the cellular terminal is not attached to the network, which is often the case when a SIM card has not been used for a long period of time.

Optionally, the invention may comprise any one of the following features and steps that can be taken separately or in combination:

According to an embodiment, the step of reactivating the SIM card comprises the following step of verifying the identity of the user, said step of verifying the identity of the user being performed before the step of re-provisioning at least the HLR/HSS:
  identifying the subscriber based on identification data received from the user of the SIM card and on identification information (20) stored in the recycler node, the identification data being different from said IMSI, and
  performing the step of re-provisioning at least the HLR/HSS only if the identification is successful.

According to an embodiment, during the identification step, the identification data is entered by the user through a man machine interface of the cellular terminal. According to an embodiment, the identification information (20) comprises an answer (20) to a secret question.

According to an embodiment, the identification data received from the user of the SIM card is sent by the user through a man machine interface of the cellular terminal. According to an embodiment, the identifier of a subscription associated to the SIM card is a Mobile Station Integrated Services Digital Network Number (MSISDN).

According to an embodiment, upon de-provisioning at least the HLR/HSS, the method comprising recycling (28) the identifier of a subscription (MSISDN 19) of said SIM card in a phone number pool (35).

According to an embodiment, the step of de-provisioning the HLR/HSS is performed after a successful completion of the step of provisioning the recycler node.

According to an embodiment, the step of provisioning the recycler node is performed when said SIM card has not been used for at least a quarantine duration. According to an embodiment, the step of de-provisioning at least the HLR/HSS comprising removing from the HLR/HSS said IMSI. According to an embodiment, the step of re-provisioning (26) at least the HLR/HSS comprises by providing back the HLR/HSS with the set of managing parameters related to said reactivated SIM card restored from the database in association with a new identifier of a subscription (new MSISDN 19), the set of managing parameters comprising said IMSI.

According to an embodiment, the step of sending any attachment request emanating from said SIM card to the recycler node comprises modifying at least a routing table of the routing node so that the routing node redirects any attachment request emanating from said SIM card to the recycler node. According to an embodiment, the step of modifying at least the routing table of the routing node is performed so that the routing node does not redirect any attachment request emanating from said SIM card to HLR/HSS. According to an embodiment, the step of reactivating the SIM card, also comprises modifying at least the routing table of the routing node so that the routing node redirects any message emanating from said SIM card to the HLR/HSS based on said IMSI. According to an embodiment, the step of reactivating the SIM card, also comprises modifying at least the routing table of the routing node so that the routing node does not redirect any more the message emanating from said SIM card to the recycler node. According to an embodiment, the step of de-provisioning at least the HLR/HSS comprises removing from the HLR/HSS all the managing parameters related to said SIM card.

According to an embodiment, the HLR/HSS detects that the SIM card has not been used for at least a quarantine duration and then:
  sends to the recycler node an instruction to perform to the step of provisioning the recycler node;
  performs the de-provisioning step.

According to an embodiment, after provisioning the recycler node and before re-provisioning (26) at least the HLR/HSS, the routing node redirects any transmission sent by the inactive SIM card to the recycler node based on said IMSI of the SIM card and wherein the recycler node and the routing node are both comprised in a single module.

According to an embodiment, before the quarantine duration has elapsed without the SIM card being used, at least one managing node of the cellular communication network taken among any one of: an authentication center (AuC), a customer relationship management (CRM), an operation support system (OSS) and a business support system (BSS), stores at least one identifier taken among the IMSI and the identifier of a subscription (MSISDN);
  and wherein after the quarantine duration has elapsed without the SIM card being used: de-provisioning said at least one managing node by removing from said least one managing node said at least one identifier taken among the IMSI and the identifier of a subscription (MSISDN).

According to an embodiment, de-provisioning said at least one managing node comprises removing from said at least one managing node all the data related to the SIM card.

According to an embodiment, after allocating (32) a new identifier of a subscription (19) to the SIM card, the method comprises the step of: re-provisioning (26) said at least one managing node by providing said at least one managing node with managing parameters related to said reactivated SIM card restored from the database.

According to an embodiment, the step of provisioning the recycler node with the IMSI is performed before said SIM card has not been used for at least a quarantine duration.

According to an embodiment, after said SIM card has not been used for at least a quarantine duration the recycler node is provisioned with the new identifier of a subscription (New MSISDN).

According to an embodiment, the step of sending any attachment request emanating from said SIM card to the recycler node comprises: the routing node redirects any attachment request emanating from said SIM card to the recycler node and to the HLR/HSS.

According to an embodiment, all messages from the cellular terminal are sent to both the recycler node and to the HLR/HSS.

According to an embodiment, the routing node duplicates any attachment request emanating from said SIM card and send it to both the recycler node and the HLR/HSS.

According to an embodiment, the routing node duplicates any message emanating from said SIM card and send it to both the recycler node and the HLR/HSS.

According to an embodiment, sending any attachment request emanating from said SIM card to the recycler node, comprises associating, in the routing tables of the routing node, the IMSI of said inactive SIM card with an address of said recycler node and with an address of the HLR/HSS.

According to an embodiment, the step of de-provisioning at least the HLR/HSS comprises keeping in the HLR/HSS said IMSI related to said SIM card.

According to another embodiment, the invention describes a computer-program product that contains software program instructions, where execution of the software program instructions by at least one data processor results in performance of operations that comprise execution of at least the following steps: identifying that a SIM card has not been used for at least a quarantine duration, then:
  provisioning a recycler node which comprises backing up in at least a database stored in at least a data storage device of said recycler node: managing parameters comprising at least an International Mobile Subscriber Identifier (IMSI);
  sending an instruction to modify at least a routing table of a routing node so that the routing node can redirect any attachment request emanating from said SIM card to the recycler node;
  after the provisioning of the recycler node, and upon reception of an attachment request emanating from said SIM card performing the following steps;
  allocating a new identifier of a subscription (new MSISDN 19);
  providing to a managing node the set of managing parameters related to said reactivated SIM card restored from the database in association with the new identifier of a subscription (new MSISDN 19), the set of managing parameters comprising said IMSI;
  sending an instruction to modify at least the routing table of the routing node so that the routing node redirects any message emanating from said SIM card to said managing node.

According to another embodiment, the invention describes a recycler node configured to be connected in a cellular communication network comprising at least a managing node that stores managing parameters related to a SIM card associated to a cellular terminal configured to be connected to the network and at least a routing node configured to route requests between the cellular terminal and the managing node, said managing parameters comprising at least an International Mobile Subscriber Identifier (IMSI), characterized in that:
the recycler node is configured to execute the following steps when said SIM card has not been used for at least a quarantine duration:
  provisioning a database of the recycler node which comprises backing up in at least a database stored in at least a data storage device of said recycler node: managing parameters comprising at least said IMSI;
  sending an instruction to modify at least a routing table of the routing node so that the routing node can redirect any attachment request emanating from said SIM card to the recycler node;
  and characterized in that the recycler node is configured to execute the following steps after the provisioning of the recycler node, and upon reception of an attachment request emanating from said SIM card:
  allocating a new identifier of a subscription (new MSISDN 19);
  providing to a managing node at least said IMSI related to said reactivated SIM card restored from the database in association with a new identifier of a subscription (new MSISDN 19);
  sending an instruction to modify at least the routing table of the routing node so that the routing node redirects any According to another embodiment, the invention describes a method in a cellular communication network comprising at least a home location register/home subscriber server (HLR/HSS) that stores managing parameters related to a SIM card associated to a cellular terminal configured to be connected to the network, and at least a routing node configured to route requests between the cellular terminal and the HLR/HSS, wherein:
the method comprises the following steps when said SIM card has not been used for at least a quarantine duration:
  de-provisioning at least the HLR/HSS by removing from the HLR/HSS an identifier of a subscription (MSISDN) associated to the SIM card and said managing parameters, said managing parameters comprising at least a unique identifier of the SIM card (IMSI); characterized in that the method also comprises the following steps preferably performed when said SIM card has not been used for at least the quarantine duration, i.e., after the quarantine period following the last activation has lapsed:
  provisioning a recycler node which comprises backing up in at least a database stored in at least a data storage device of said recycler node: said managing parameters and optionally at least an identification information for identifying the subscriber of said SIM card;
  modifying at least a routing table of the routing node so that the routing node does not redirect any more the messages from the SIM card to the HLR/HSS. The routing table is modified so that the routing node redirects any attachment request emanating from said SIM card to the recycler node;
after the provisioning of the recycler node, after the de-provisioning of at least the HLR/HSS and upon the detection an activity of the SIM card, such as upon the reception at the recycler node of an attachment request emanating from said SIM card, the method comprises reactivating the SIM card through performing the following steps:
  optionally, the method comprises a step of identifying the subscriber based on identification data received from the user of the SIM card and on the identification information stored in the recycler node; and performing the following steps if the identification is successful:

this identification step is only facultative and the reactivation process can be achieved without performing any identification step.

re-provisioning at least the HLR/HSS by providing back to the HLR/HSS the set of managing parameters related to said reactivated SIM card restored from the database in association with the new identifier of a subscription (new MSISDN) (new phone number);

modifying at least the routing table of the routing node so that the routing node redirects any message emanating from said SIM card to the HLR/HSS.

According to another embodiment, the invention provides a method in a cellular communication network comprising at least a managing node that stores managing parameters related to a SIM card associated to a cellular terminal configured to be connected to the network, and at least a routing node configured to route requests from the cellular terminal to the managing node, wherein:

the method comprises the following steps when said SIM card has not been used for at least a quarantine duration:

de-provisioning at least the managing node by removing from the managing node an identifier of a subscription (MSISDN) associated to the SIM card and said managing parameters, said managing parameters comprising at least a unique identifier of the SIM card (IMSI)

the method also comprises the following steps:

provisioning a recycler node which comprises backing up in at least a database stored in at least a data storage device of said recycler node: said managing parameters. This provisioning step is preferably but optionally performed when said SIM card has not been used for at least the quarantine duration, i.e., after the quarantine period following the last activation has lapsed.

modifying at least a routing table of the routing node through associating in the routing table the unique identifier of the SIM card (IMSI) with an address of the recycler node in the routing table. Therefore, the routing node can redirect any message, for instance an attachment request, emanating from said SIM card to the recycler node in case the managing node is a HLR/HSS for instance. Thus the routing node does not redirect any more the messages from the SIM card to the managing node. This step is performed after the quarantine duration has elapsed without activity of the SIM card.

after the provisioning of the recycler node, after the de-provisioning of at least the managing node and upon detection of an activity of the SIM card, such as for example the reception at the recycler node of a redirected attachment request emanating from said SIM card, reactivating the SIM card through performing the following steps:

allocating a new identifier of a subscription (new MSISDN) (new phone number) to the SIM card;

re-provisioning at least the managing node by providing back to the managing node the set of managing parameters related to said reactivated SIM card restored from the database in association with the new identifier of a subscription (new MSISDN) (new phone number);

modifying at least the routing table of the routing node through associating in the routing table the unique identifier of the SIM card (IMSI) with the address of the managing node. Therefore, the routing node can redirect any message emanating from said SIM card to the managing node in case the managing node is a HLR/HSS for instance.

The managing node is not necessarily a HLR/HSS. The managing node can be taken among any one of the following managing nodes: HLR/HSS, OSS, BSS, AuC, CRM, billing system.

The managing node detects that the SIM card has not been used for at least a quarantine duration and then:

sends to the recycler node an instruction to perform to the step of provisioning the recycler node;

performs the de-provisioning step.

Optionally the provisioning of the recycler node may comprise backing up in the database of the recycler node at least an identification information for identifying the subscriber of said SIM card. The invention may optionally comprise, before the step of allocating a new identifier of a subscription and re-provisioning the managing node, a step of: identifying the subscriber based on identification data received from the SIM card and on the identification information stored in the recycler node.

Then the steps of allocating a new identifier of a subscription, re-provisioning the managing node are performed only if the identification step is successful.

Hence the identification step is only facultative and the reactivation process can be achieved without performing any identification step.

Thus, according to an embodiment, the invention describes a method in a cellular communication network comprising the steps of: identifying a SIM card as inactive, provisioning a recycler node by backing up managing parameters related to said inactive SIM card, in a database Therefore, to achieve this objective of the invention, an embodiment of the invention provides means both to a cellular network operator and to a cellular terminal user, to reuse a SIM card even once it has been inactivated.

Therefore, once the SIM card is considered as deactivated by the HLR/HSS, the data associated to the SIM card are removed from the HLR/HSS. Thus, the deactivated SIM card does not occupy anymore network resources. In addition, the identifier of the subscription associated to the SIM card, typically the MSISDN previously allocated to the subscription, can be re-allocated to another subscriber.

In case the subscriber wants to re-activate its SIM card, then the recycler node receives the attachment request from the SIM card tanks to the network routing means (STP for instance or any routing node) that has been modified so as to route the attachment requests from this SIM card toward the recycler node although the HLR/HSS is not any more enabled to receive and process the messages from the SIM card. Optionally, but advantageously an identification of the subscriber is performed based on the identification information previously provisioned in its database. Therefore, the subscriber does not need to perform a longue and tedious identification process, which usually requires sending many documents and certificates (such as identification documents and proof of residence).

In case the identification process succeeds, a new identifier of a subscription, typically a new MSISDN, is allocated to the SIM card.

Then the data stored in the recycler node along with the new identifier of a subscription are provided back to the HLR/HSS.

Therefore, any further message from the re-activated SIM card is routed to the HLR/HSS. The SIM card is thereby reactivated.

Its IMSI has been kept unchanged while its initial MSISDN has been replaced.

Optionally, the invention may comprise any one of the following features and steps that can be taken separately or in combination:

According to an embodiment, the step of de-provisioning the HLR/HSS, comprises removing from the HLR/HSS all the managing parameters related to said SIM card, i.e., all the data related to said SIM card.

According to an embodiment, upon de-provisioning at least the HLR/HSS, the method comprising recycling the identifier of a subscription (MSISDN) (19) of said SIM card in a phone number pool.

According to an embodiment, the identifier of the SIM card is an International Mobile Subscriber Identifier (IMSI) and the identifier of a subscription associated to the SIM card is a Mobile Station Integrated Services Digital Network Number (MSISDN).

According to an embodiment, the set of managing parameters comprises at least: the IMSI associated to the SIM card, an encryption key (Ki).

According to an embodiment, the set of managing parameters does not comprise the identifier of a subscription (MSISDN) associated to the SIM card, the identifier of a subscription (MSISDN) associated to the SIM card being thereby removed from the HLR/HSS upon de-provisioning the HLR/HSS without being provisioned in the recycler node. Therefore, once the MSISDN is removed from the managing nodes of the network, this MSISDN is not anymore associated to the de-activate SIM card is thereby available for any other SIM card that requires the allocation of a MSISDN.

According to an embodiment, modifying the routing table of the routing node so that the routing node redirects any message emanating from said SIM card to the recycler node comprises associating, in the routing tables of the routing node, the IMSI of said inactive SIM card with the address of said recycler node.

According to an embodiment, the step of de-provisioning the HLR/HSS is performed after a successful completion of the step of provisioning the recycler node.

According to an embodiment, the step of provisioning the recycler node is triggered upon detection that the SIM card has not been used for at least a quarantine duration.

According to an embodiment, the step of provisioning the recycler node is performed in response to an instruction received from the HLR/HSS.

According to an embodiment, the HLR/HSS detects that the SIM card has not been used for at least a quarantine duration and then:
  sends to the recycler node an instruction to perform to the step of provisioning the recycler node;
  performs the de-provisioning step.

According to an embodiment, after provisioning the recycler node and before re-provisioning at least the HLR/HSS, the routing node redirects any transmission sent by said inactive SIM card to the recycler node.

According to another feature of the invention, identifying the subscriber of said SIM card comprises asking the user of the SIM card secret question, whose answer has been backed up before inactivation in the recycler node.

According to an embodiment, the identification information comprises an answer to a secret question. The identification information can be a personal identification number (PIN code) that is, before the SIM card is de-activated, provided to the user of the cellular phone or that is entered by the user of the cellular phone and then and stored in the cellular communication network (for instance in the HLR/HSS). The identification data is sent by the user through the man machine interface of the cellular terminal when the user wants to re-activate the SIM card. Typically, the identification is successful if the identification data entered by the user matches the identification information stored in the recycler node.

The identification information can also be or comprise an answer to a secret question, the answer being entered by the user of the cellular phone and stored in the cellular communication (for instance in the CRM) network before the SIM card is de-activated.

According to an embodiment, before said SIM card has not been used for at least a quarantine duration at least one managing node of the cellular communication network taken among any one of: an authentication center (AuC), a customer relationship management (CRM), an operation support system (OSS) and a business support system (BSS), stores at least one identifier taken among the identifier of the SIM card (IMSI) and the identifier of a subscription (MSISDN). After said SIM card has not been used for at least a quarantine duration: de-provisioning said at least one managing node by removing from said least one managing node said at least one identifier taken among the identifier of the SIM card (IMSI) and the identifier of a subscription (MSISDN).

According to an embodiment, de-provisioning said at least one managing node comprises removing from said at least one managing node all the data related to the SIM card.

According to an embodiment, after allocating a new identifier of a subscription to the SIM card, the method comprises the step of: re-provisioning said at least one managing node by providing said at least one managing node with managing parameters related to said reactivated SIM card restored from database.

According to an embodiment, said re-provisioning step further comprises redirecting back any message emanating from or directed toward said reactivated SIM card to the previous addresses.

According to an embodiment, the method comprising the step of deleting any backed up managing parameters related to said reactivated SIM card out of the database.

According to an embodiment, said database is located in said recycler node.

According to an embodiment, the quarantine duration ranges between 30 days and 352 days and preferably between 30 days and 180 days. If the quarantine duration ends and that the SIM card has not been activated, then the SIM card is considered as inactive and can be re-activated according to the method of the invention.

The routing node of the invention can be any routing node configured to selectively modify the data associated to a SIM card independently of the other SIM cards of the routing table. A routing table stores for each SIM card at least an association of the IMSI of the SIM card and a routing address (for instance the address of the HLR/HSS for this SIM card). The routing node of the invention must be capable of modifying the routing address of this SIM card without modifying the routing address of the other SIM cards.

According to an embodiment, the routing node is a signalling transfer point usually referred to as its acronym STP. The routing node can also by any other node configured to perform a routing of these messages.

According to another embodiment, the recycler node and the routing node are both comprised in a single node. This single node, referred to as the recycler module thus has a component in charge of the routing of messages from/toward the SIM card.

According to this embodiment, when the managing node (HLR/HSS for instance) is provisioned with the managing parameters (i.e., when the SIM card is considered as active), the routing node of the recycler module receives all messages from the SIM card and routes them to the managing node.

Upon de-provisioning of the managing node and provisioning of the recycler node (i.e., when the SIM card is de-activated), the routing node of the recycler module routes the messages from the SIM card to the recycler node which has been previously provisioned with the managing parameters.

Upon re-provisioning of the managing node (typically the HLR/HSS) (i.e., when the SIM card is re-activated), the recycler module modifies its routing component (routing node of the recycler module) in order to forward the messages to the managing node to complete the re-activation.

One advantage of this embodiment is that if the conventional routing nodes of the cellular communication network are not able to perform the modification of the routing as requested (in particular the modification of the routing table for a single given SIM card), this additional component included in the recycler module is able to do that.

Therefore, the invention makes it easier to implement the invention in an existing cellular network wherein the routing nodes are not configured to allow modifying in their routing table the routing parameters for each SIM card individually.

The recycler module can be composed of a single hardware unit or can be composed of a plurality of hardware units.

According to an embodiment, the invention describes a computer-program product that contains software program instructions, where execution of the software program instructions by at least one data processor results in performance of operations that comprise execution of at least the following steps: identifying that a SIM card has not been used for at least a quarantine duration, then:
provisioning a recycler node which comprises backing up in at least a database stored in at least a data storage device of said recycler node: managing parameters comprising at least a unique identifier of the SIM card (IMSI) and optionally at least an identification information for identifying the subscriber of said SIM card;
optionally, sending an instruction to modify at least a routing table of the routing node so that the routing node can redirect any attachment request emanating from said SIM card to the recycler node; this step is only facultative and can be performed by another module of the cellular communication network.
after the provisioning of the recycler node, and upon detection of an activity of the SIM card, such as the reception of a redirected attachment request emanating from said SIM card:
optionally identifying the subscriber based on identification data received from the user of the SIM card and on the identification information stored in the recycler node; and performing the following steps if the identification is successful: this identification step is only facultative and the reactivation process can be achieved without performing any identification step.
allocating a new identifier of a subscription (new MSISDN) (new phone number)
providing to a managing node the set of managing parameters related to said reactivated SIM card restored from the database in association with the new identifier of a subscription (new MSISDN) (new phone number);
optionally, sending an instruction to modify at least the routing table of the routing node so that the routing node redirects any message emanating from said SIM card to said managing node. This step is only facultative and can be performed by another module of the cellular communication network.

According to an embodiment, the invention describes a recycler node configured to be connected in a cellular communication network comprising at least a managing node that stores managing parameters related to a SIM card associated to a cellular terminal configured to be connected to the network and at least a routing node configured to route requests between the cellular terminal and the managing node, characterized in that:
the recycler node is configured to execute the following steps when said SIM card has not been used for at least a quarantine duration:
identifying that a SIM card has not been used for at least a quarantine duration. The identifying step for example comprises receiving an information from another node of the network and that indicates that the SIM card has not been used for at least a quarantine duration. This step can also comprises detecting that a period of time that exceeds the quarantine duration has elapsed without the SIM card being used.
provisioning a database of the recycler node which comprises backing up in at least a database stored in at least a data storage device of said recycler node: managing parameters comprising at least a unique identifier of the SIM card (IMSI) and optionally at least an identification information for identifying the subscriber of said SIM card;
optionally, sending an instruction to modify at least a routing table of the routing node so that the routing node can redirect any attachment request emanating from said SIM card to the recycler node; this step is only facultative and can be performed by another module of the cellular communication network.
and in that the recycler node is configured to execute the following steps after the provisioning of the recycler node, and upon reception of an attachment request emanating from said SIM card:
optionally identifying the subscriber based on identification data received from the user of the SIM card and on the identification information stored in the recycler node; and performing the following steps if the identification is successful: this identification step is only facultative and the reactivation process can be achieved without performing any identification step.
allocating a new identifier of a subscription (new MSISDN) (new phone number)
providing to a managing node the set of managing parameters related to said reactivated SIM card restored from the database in association with the new identifier of a subscription (new MSISDN) (new phone number);
optionally, sending an instruction to modify at least the routing table of the routing node so that the routing node redirects any message emanating from said SIM card to said managing node. This step is only facultative and can be performed by another module of the cellular communication network.

According to an embodiment, the invention describes a system for a cellular communication network comprising:
at least a managing node that stores managing parameters related to a SIM card (4) associated to a cellular terminal configured to be connected to the network:

at least a routing node configured to route requests between the cellular terminal and the managing node; and at least a recycler node according to the invention.

According to an embodiment, the invention describes a system for a cellular communication network comprising at least a managing node that stores managing parameters related to a SIM card associated to a cellular terminal configured to be connected to the network, and at least a routing node configured to route requests between the cellular terminal and the managing node. The system also comprises a recycler node and in that the system is configured to execute the following steps when said SIM card has not been used for at least a quarantine duration:

de-provisioning at least the managing node by removing from the managing node an identifier of a subscription (MSISDN) associated to the SIM card and said managing parameters, said managing parameters comprising at least a unique identifier of the SIM card (IMSI)

provisioning the recycler node which comprises backing up in at least a database stored in at least a data storage device of said recycler node: said managing parameters and optionally at least an identification information for identifying the subscriber of said SIM card. This step is preferably but optionally performed when said SIM card has not been used for at least the quarantine duration.

modifying at least a routing table of the routing node through associating in the routing table the unique identifier of the SIM card (IMSI) with an address of the recycler node in the routing table. Therefore, the routing node does not redirect any more the messages from the SIM card to the managing node. The routing table is modified so that the routing node can redirect any message, for instance an attachment request, emanating from said SIM card to the recycler node in case the managing node is a HLR/HSS for instance. This step is performed after the quarantine duration has elapsed without activity of the SIM card.

and wherein the system is configured to execute the following step after the provisioning of the recycler node, after the de-provisioning of at least the managing node and upon reception at the recycler node of an attachment request emanating from said SIM card, reactivating the SIM card through performing the following steps:

allocating a new identifier of a subscription (new MSISDN) (new phone number) to the SIM card;

re-provisioning at least the managing node by providing back to the managing node the set of managing parameters related to said reactivated SIM card restored from the database in association with the new identifier of a subscription (new MSISDN) (new phone number);

modifying at least the routing table of the routing node through associating in the routing table the unique identifier of the SIM card (IMSI) with the address of the managing node. Therefore, the routing node can redirect any message emanating from said SIM card to the managing node in case the managing node is a HLR/HSS for instance.

According to another embodiment, the invention describes a method in a cellular phone network comprising the steps of: identifying a SIM card as inactive when said SIM card has not been used for at least a quarantine duration, provisioning a recycler node by backing up managing parameters related to said inactive SIM card, in a database.

Optionally, the invention may comprise any one of the following features and steps that can be taken separately or in combination:

the method further comprises the steps of: de-provisioning relevant managing nodes by removing managing parameters related to said inactive SIM card, redirecting any attachment request emanating from said inactive SIM card to the recycler node, recycling the phone number of said inactive SIM card in a phone number pool.

said redirecting step further comprises redirecting any message sent by said inactive SIM card to the recycler node.

the provisioning step further comprises backing up a means for identifying the subscriber of said SIM card, in said database.

the means for identifying comprises an answer to a secret question.

said managing parameters comprise: IMSI, Ki and other parameters specific to IMSI (defined in SIM output file)

said relevant managing nodes comprise: HLR/HSS, OSS, BSS, AuC, CRM, IN.

the redirecting step comprises associating the IMSI of said inactive SIM card with the address of said recycler node, in the routing tables.

the method further comprises: identifying a SIM card as reactivated when receiving a redirected attachment request emanating from said inactive SIM card, providing a new phone number to said reactivated SIM card, out of a phone number pool, re-provisioning relevant managing nodes by providing back managing parameters related to said reactivated SIM card restored from database.

said re-provisioning step further comprises redirecting back any message emanating from or directed toward said reactivated SIM card to the previous addresses.

Others features, details and advantages of the invention will become more apparent from the detailed illustrating description given hereafter with respect to the drawings on which:

FIG. 1 shows a schematic view of an embodiment of a typical cellular communication network, FIG. 2 shows a state diagram of a cellular terminal subscription, according to prior art, FIG. 3 shows a state diagram of a cellular terminal subscription, according to the invention, FIG. 4 shows a schematic view of an embodiment of a recycler node, FIG. 5 shows a diagram of the processes applied by a recycler node.

In the context of the present invention, the term terminal encompasses all terminals that are configured to communicate in a cellular communication network. The term terminal is equivalent to mobile terminal or cellular terminal or handset or mobile equipment or smartphone. A terminal can for instance be a mobile phone but also a digital pad, a digital tablet, a tablet computer or all equipment configured to communicate over a cellular communication network using a SIM card.

In the context of the present invention, the term SIM card encompasses all the embodiments of integrated circuits that store at least an identifier such as the international mobile subscriber identity (IMSI) and possibly at least a related key used to identify and authenticate subscribers on a cellular communication networks. The SIM card can be inserted in a removable manner in the cellular terminal or can be embedded in the cellular terminal without being removable. The term SIM card usually stands for subscriber identity module or subscriber identification module.

Figure 1:
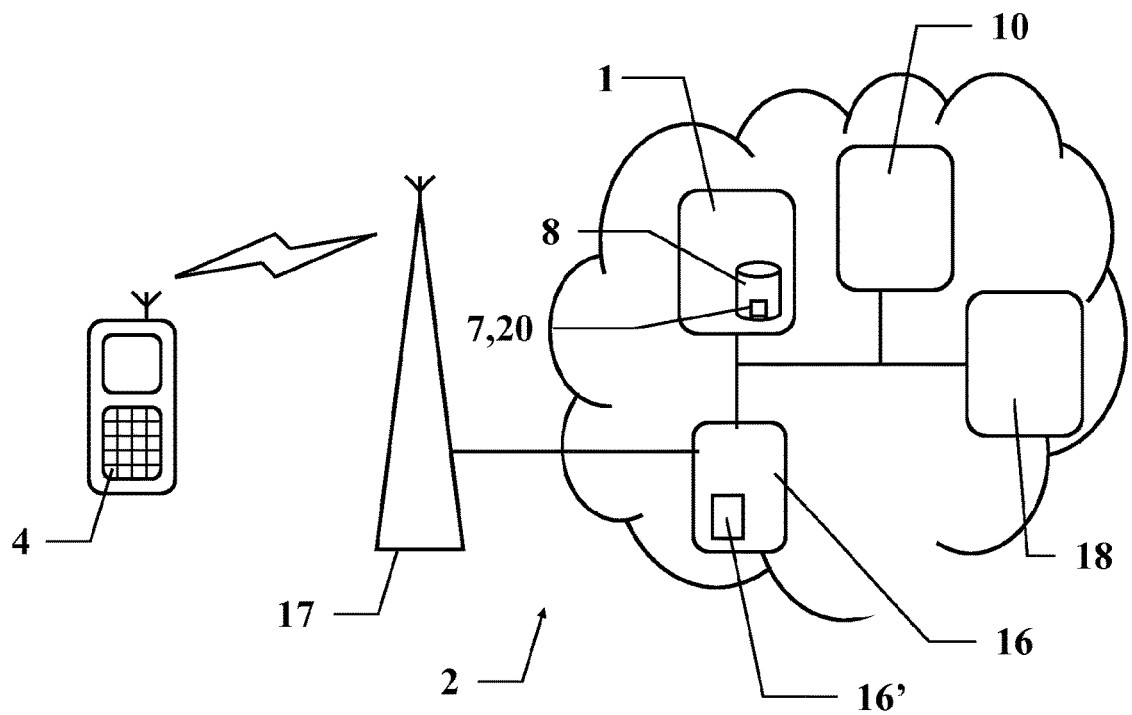

FIG. 1 shows a cellular communication network 2 in relation with cellular a terminal, here figured by its SIM card 4. In the description below, the cellular terminal and the SIM card 4 will be regarded as a single element referred to as the SIM card. Such a cellular communication network 2 comprises a core network, figured here by a cloud, comprising managing nodes 10, 18, generally interconnected by wires and also interconnected with at least one base station 17. Said base station 17 comprises radio communication devices to establish a wireless connection with at least one terminal.

When a terminal first establishes an attachment to the cellular communication network 2, it starts an initialization process. During said initialization process, the terminal identifies itself by means of identifiers pertaining to its SIM card 4. During said initialization process, some managing parameters 7 dedicated to said SIM card 4 are used. Said managing parameters 7 are specific to said SIM card 4 and are used by the cellular communication network 2 to handle said SIM card 4 when it uses the services of the cellular communication network 2. In particular, said managing parameters 7 are used to route messages having said SIM card as recipient or sender.

Each SIM card 4 stores an identifier of the SIM card which uniquely identifies the SIM card 4 and which is usually referred to as the International Mobile Subscriber Identifier (IMSI). When the SIM card 4 requests an attachment to the cellular communication network 2, it sends the IMSI to the cellular communication network 2 for identification. The first time the SIM card 4 requests an attachment, during the initialization, the IMSI needs to be defined in an Authentication Centre node, AuC. If the authentication is not accepted, the attachment between the SIM card 4 and the cellular communication network 2 is denied.

During said initialization process, a SIM card 4 is allocated an identifier of the subscription, which is usually referred to as the Mobile Station Integrated Services Digital Network Number (MSISDN). The MSISDN can be considered as the phone number 19 used by users of the cellular communication network 2.

Among all the managing nodes 10,18 of the cellular communication network 2, some managing nodes 10, here called "relevant managing nodes" 10, are more prone to need said managing parameters 7 and keep a record of said managing parameters 7. For example, such a relevant managing node 10 can be the HLR/HSS, a VLR, the AuC, an Operations Support System node, OSS, or a Business Support System node, BSS or a Signal Transfer Point node, STP or a Customer Relationship Management node (CRM). Thus when the SIM card 4 further attaches to the cellular communication network 2, any relevant managing node 10 can use its recorded copy of the managing parameters 7 related to said SIM card 4.

Either because they must comply to some national regulations or for commercial reasons, cellular communication network operators respect a quarantine duration 5 between the date $t_i$ of the last time a given SIM card 4 has been used and the date $t_f$ of its deactivation. Once the SIM card is considered as deactivated, the operator is allowed to entirely delete from the cellular communication network 2 records all its managing parameters.

In the context of the invention the last use, i.e., the last activity, of a SIM card may correspond to any one of the following events:
  receiving/sending an attachment request for attaching the cellular terminal to the cellular communication network;
  receiving/giving a call;
  receiving/sending a short message service message (SMS) or a multimedia messaging service message (MMS);
  receiving/sending data packets
  receiving/sending an update location message.

Figure 2:
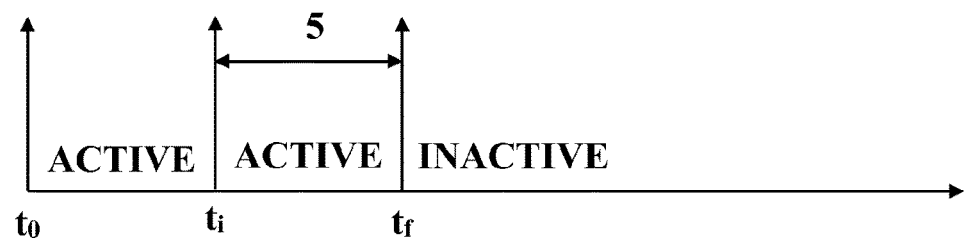

This prior art methods, currently used, is illustrated in FIG. 2. Once a SIM card 4 has gone through the initialization process at $t_o$, its state is considered as ACTIVE. Date $t_i$ indicates the date of the last usage of said SIM card 4 and starts a quarantine duration 5 observation period. If at date $t_f$ said quarantine duration 5 ends, without any further use of said SIM card 4 being observed, then the SIM card 4 can be de-activated and its state is then turned to INACTIVE. All the resources used in the cellular communication network 2, dedicated to said cellular SIM card 4, e.g. managing parameters 7 stored by said relevant managing nodes 10, can be deleted or de-provisioned and thus freed so as to be eventually reused. It is therefore like said SIM card 4 no longer exists in the cellular communication network 2. Said deletion is final with the solution of the state of the art.

Said final deletion leads to a waste of SIM card. An inactivated SIM card is of no use, and can be thrown away. If a user wants to reconnect to a cellular communication network 2, he/she must obtain a new SIM card, generally provided by the cellular communication network operator.

In some countries, regulations make the process to obtain a subscription and a SIM card 4 very long and complex. For instance, a candidate subscriber must provide identity documents, photos, proof of address, these documents are stored and checked by the cellular communication network operator, then some days later the future subscriber call back the cellular communication network operator, must answer some secret questions to have his/her SIM card activated. Such a process, mandatory, is very expensive for the cellular communication network operator. Moreover it can be disincentive for a former subscriber to revert back to a cellular communication network he/she had left, if all said process has to be done again.

Figure 3:
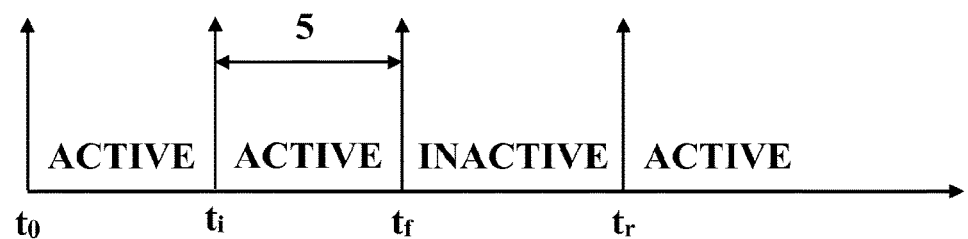

To overcome said disadvantages, a new method, is proposed by the invention, an embodiment of which being illustrated in FIG. 3. According to said new method, an INACTIVE SIM card can be, under some conditions, reactivated, that is, returned to an ACTIVE state, at date $t_r$.

Such a method is realized through the use of a new node connected to the cellular communication network, hereafter called a recycler node 1. Advantageously, said recycler node 1 can be located, contrary to relevant managing nodes 10, in a part of the cellular communication network 2 not incurring rent on a per SIM card basis.

Figure 4:
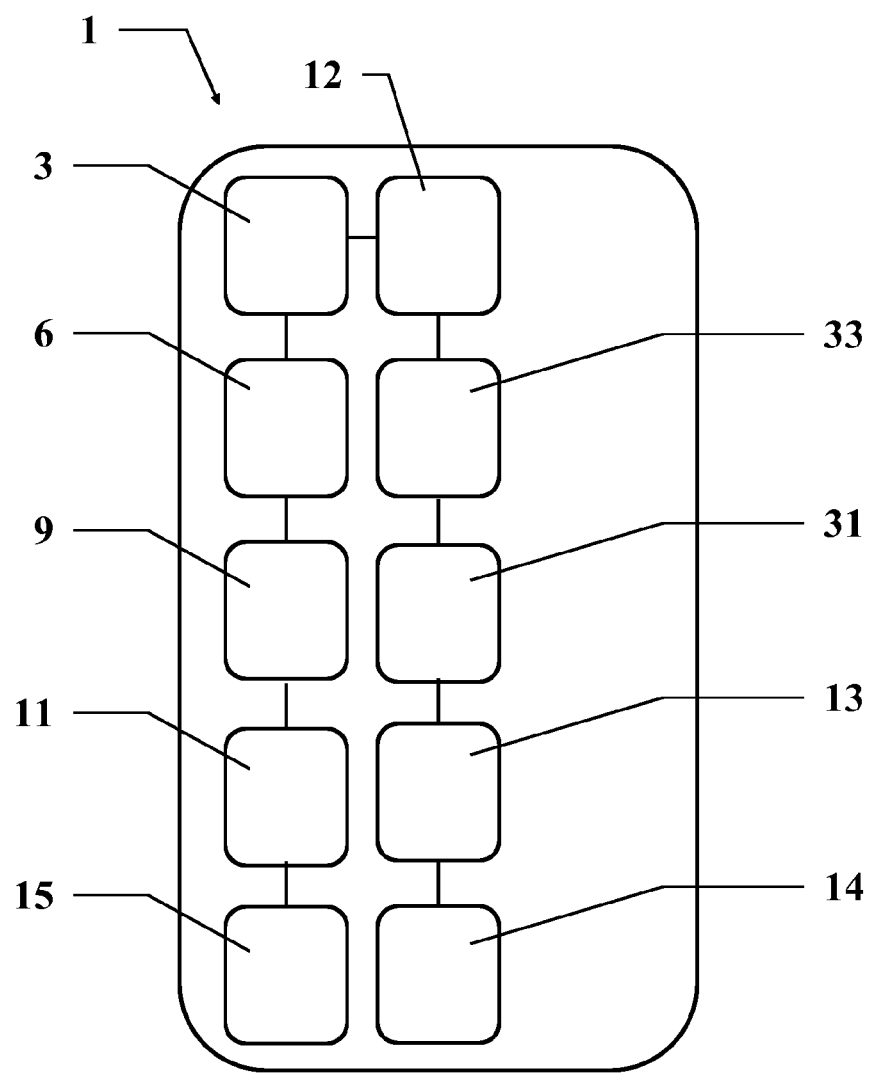
Figure 5:
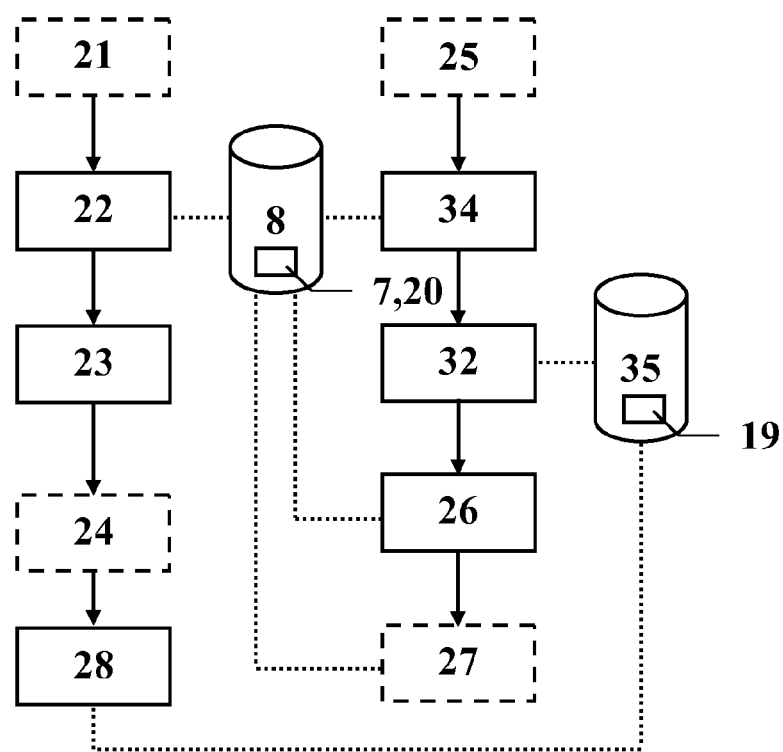

Such a recycler node 1, illustrated in FIG. 4 is configured to implement at least two processes: a preparation process and a reactivation process respectively illustrated in FIG. 5, left column and right column. The preparation process is executed when a SIM card 4 is about to be inactivated and prepares the cellular communication network 2 to be able to further reactivate said SIM card 4. The reactivation process actually applies the reactivation of said SIM card 4. A recycler node 1 is in charge of managing SIM cards 4 when they become INACTIVE so as to be able to reactivate them later in case a reactivation is requested.

The preparation process, illustrated in FIG. 5, left column, starts with an optional inactive marking step 21, e.g. applied by an inactive marking element 3, when it is determined that a SIM card 4 has not been used for a quarantine duration 5 or more.

Said determination may be made by the recycler node 1 itself or it can be made by another managing node 10, 18 and signalled to the recycler node 1. In this second case, the inactive marking element 3 only receives said determination signalling. Said determination can typically be made using a history of the operations implying said SIM card 4, by comparing the date of the last operation and the current date to said quarantine duration 5. Following said determination, the inactive marking element 3, during an inactive marking step 21, marks said SIM card 4 as INACTIVE, to indicate its state became INACTIVE for further proceeding.

Said marking step 21 is only optional. The further steps can be initiated, without any marking step and upon reception of an instruction from a managing node or from the determination by the recycler node 1 itself that the SIM card 4 has been not active for a period of time that exceeds the quarantine duration 5.

Said marking step is only computational and intended to indicate to others processes that the state of said SIM card 4 has changed in order to trigger specific processings. Said marking shall not be construed as physically or even electronically marking said SIM card 4. A possible implementation is a numerical record associating both the IMSI of said SIM card 4 and an INACTIVE state indicator.

In fact the marking element 3 does not even need the SIM card 4 to be present in the cellular communication network 2, e.g. by being embedded into a powered on terminal, to proceed. This is advantageous in that the inactivation process may be applied even when a SIM card 4 is not attached to the cellular communication network 2 while allowing a subsequent re-activation process.

Next a provisioning step 22 is applied by a provisioning element 6. During said provisioning step 22, managing parameters 7 related to said inactive SIM card 4, are saved in a database 8 stored in at least a memory connected to the recycler node 1. Said managing parameters 7 may be transmitted to the recycler node 1 from at least one of the relevant managing nodes 10 currently storing them.

Next a release or de-provisioning step 23 can be applied. Since the managing parameters 7 related to said inactive SIM card 4 are now backed up in said database 8, relevant managing nodes 10 can be de-provisioned by removing said managing parameters 7 from their memory. This can be triggered or performed by a module of the recycler node 1, referred to as the release or de-provisioning element 9.

According to an embodiment, the de-provisioning element 9, informs said relevant managing nodes 10, all along the cellular communication network 2, and informs them that they can consider said now inactive SIM card 4 as no longer being present in the cellular communication network 2. Accordingly, said relevant managing nodes 10 does not need to carry on storing said managing parameters 7 related to said inactive SIM card 4. Consequently said relevant managing nodes 10 can possibly delete said managing parameters 7 from their memory. Alternatively, the de-provisioning element 9 is in charge of de-provisioning at least some of the managing nodes 10, 18.

It should be noted that many operators rent or lease the managing nodes they use and that they are charged for each SIM card associated to parameters stored in the managing nodes. Therefore, removing from the managing nodes 10, 18 the managing parameters associated to non-active SIM cards allows operators to save a lot of money.

Since the SIM card 4 is now in an INACTIVE state, the identifier (MSISDN) associated to said cellular terminal subscription 4, referred to as the "phone number 19" can be freed. This may be done during a recycling step 28 by a recycler means 15. Said phone number 19 is made available and can for instance be placed in a phone number pool 35. Thereafter, said freed phone number 19 can be allocated to another SIM card when said other SIM card is performing its first activation.

Typically, the managing parameters 7 de-provisioned from the managing nodes 10, 18 comprise the IMSI.

For instance, the following managing parameters are de-provisioned from the: HLR/HSS: IMSI, MSISDN. In addition, the following managing parameters may optionally be de-provisioned from the HLR/HSS: ICCID (Integrated Circuit Card Identifier), profile for this IMSI.

AuC: IMSI, Ki.

BSS: IMSI, ICCID, MSISDN. In addition, the following managing parameters may optionally be de-provisioned from the BSS: profile associated for the user, such as the account.

OSS: IMSI, ICCID, MSISDN. In addition, the following managing parameters may optionally be de-provisioned from the OSS: profile associated for the user, such as the account.

CRM: IMSI, MSISDN. In addition, the following managing parameters may optionally be de-provisioned from the CRM: user information such as name, address, PUKs.

OTA server: IMSI, OTA keys.

Once the recycler node 1 is provisioned and while the SIM card is de-activated, the recycler node 1 can take over functionalities previously performed by managing nodes, such as the HLR/HSS. This is detailed below.

A redirection element 11 can apply a redirecting step 24 that is intended to provide a way to take care of an incoming attachment request emanating from said inactive SIM card 4. Since the managing node 10 (e.g. HLR/HSS) formerly in charge of said task is no longer provisioned it cannot apply the processing. According to the invention, said incoming attachment request is redirected to the recycler node 1, and said recycler node 1 is able to handle said attachment request.

This redirecting step 24 is necessary to be able to reactivate said inactive SIM card 4.

An attachment request sent by an inactive SIM card 4 indicates it needs a service of the cellular communication network 2 and thus the necessity of its reactivation.

When a SIM card 4 is turned into an INACTIVE state, the relevant managing nodes 10 are no longer provisioned and cannot respond to any operation related to said SIM card 4. The redirection of any attachment request emanating from said inactive SIM card 4 is necessary to be able to reactivate said SIM card. The solution provided by the invention is detailed below after a brief reminder of the known routing solutions.

In a cellular communication network 2, any signalling message is routed according to routing tables 16' comprising addresses of the recipient. Said routing tables 16' are contained and managed by routing nodes 16 such as STP nodes for example.

For instance, when a SIM card 4 is active a routing node 16 comprises a routing table 16' where the IMSI of a SIM card 4 is associated to the address of the HLR/HSS in charge of keeping track of the location of the SIM card 4 in the cellular communication network 2. A SIM card 4, identified by its IMSI, is thus associated to a "toward" address for the messages toward the SIM card 4 and to a "from" address for the messages incoming from said SIM card 4. In nominal functioning, said "toward" address may be a physical address, e.g. the address of the base station 17 said SIM card 4 is attached through or the address of a voice box when the SIM card 4 is not attached. In nominal functioning, said "from" address may be the physical address of a managing node 10 in charge of the SIM card 4, typically the HLR/HSS. So, a routing table 16' associates the IMSI of said SIM card 4 with its "toward" and "from" addresses. Said routing tables 16' are dynamically updated, e.g. to follow a SIM card 4 during roaming.

In the method of the invention, once the recycler node 1 is provisioned, the routing nodes 16 are modified so that in their routing tables 16' the SIM card 4 is from now on associated to the address of the recycler node instead of being associated to the conventional managing node such as the HLR/HSS. Therefore, the recycler node 1 can acts as a HLR/AuC or HSS/AuC during the de-activation period of the SIM card 4, when then the user, through dialoguing with the subscriber as it will be explained below.

Thus, according to an embodiment of the invention, the redirecting step 24 applied when a SIM card 4 is turned into an INACTIVE state, can be implemented by updating said routing tables 16' in the routing nodes 16. In said routing tables 16' the IMSI of said de-activated SIM card 4 is associated with the address of the recycler node 1, for both the "toward" and "from" addresses. By doing so, a message, such as an attachment request, emanating from said SIM card 4 ("from" case) is redirected by the routing table 16' of the routing node 16 to the recycler node 1 acting to reactivate said SIM card 4. Similarly a message directed to the de-activated SIM card 4 is also redirected by the routing table 16' of the routing node 16 to the recycler node 1.

It should be noted that the step of modifying the routing nodes 16 (STP for instance) is not mandatorily triggered by the recycler node 1. According to another embodiment, a managing node such as the HLR/HSS, sends to the routing nodes 16 an instruction to update their routing tables 16'.

Thus, the routing node 16 of the invention is configured to selectively modify in its routing table 16' the data related to one single SIM card only.

In the present description, the term managing parameters 7 comprise for each SIM card 4 at least the IMSI of the SIM card 4 and the encryption key Ki, allocated to said SIM card 4 after it has been initialized. It has to be noted that, when it is inactive, no MSISDN is further allocated to said SIM card 4, and that said MSISDN does not pertain to said managing parameters 7.

In the present description, the term relevant managing nodes 10 comprise any managing node 10,18 using any one of said managing parameters 7. They comprise for instance at least one of the following components: HLR/HSS, OSS, BSS, AuC, CRM, STP.

The database 8, used to backup managing parameter 7 when a SIM card 4 is inactive, can be anywhere. However it is advantageously located in said recycler node 1 or at least in an area managed by said recycler node 1.

The reactivation process, illustrated in FIG. 5, right column, starts with a reactivation marking step 25. Said reactivation marking step 25 may be applied e.g. by a reactivation marking element 12 and is initiated when an attachment request emanating from an inactive SIM card 4 is received. Since said attachment request is redirected following the previously described redirection step 24, the recycler node 1 is the receiver. Upon receiving said redirected attachment request the reactivation marking element 12 marks said SIM card 4 as reactivated. Said marking is only optional and is only computational. Said reactivated state is indicating that the SIM card 4 intends to attach to the cellular communication network 2 and thus must be replaced in an ACTIVE state again.

A first step of the reactivation process is the provision 32, done e.g. by a numbering module 31, of a new phone number 19, MSISDN, to the newly reactivated SIM card 4. Such a new phone number 19 can be obtained from a phone number pool 35. According to an optional embodiment, the MSISDN may be selected by the user, for instance among a set of MSIDN proposed by the operator.

The reactivation process goes on with a re-provisioning step 26 of the relevant managing nodes 10, applied e.g. by a re-provisioning element 13. During said re-provisioning step 26, the managing parameters 7 related to said reactivated SIM card 4 are restored, that is, they are retrieved from database 8 where they were previously backed up and are provided back to the relevant managing nodes 10. After said re-provisioning step 26, the relevant managing nodes 10 are, with respect to said SIM card 4 as they were initially, before the SIM card 4 was turned into an INACTIVE state.

Typically, the managing parameters 7 re-provisioned in the managing nodes 10, 18 comprise the IMSI.

For instance, the following managing parameters are re-provisioned in the:
  HLR/HSS: IMSI, MSISDN. In addition, the following managing parameters may optionally be de-provisioned from the HLR/HSS: ICCID (Integrated Circuit Card Identifier), profile for this IMSI.
  AuC: IMSI, Ki.
  BSS: IMSI, ICCID, MSISDN. In addition, the following managing parameters may optionally be de-provisioned from the BSS: profile associated for the user, such as the account.
  OSS: IMSI, ICCID, MSISDN. In addition, the following managing parameters may optionally be de-provisioned from the OSS: profile associated for the user, such as the account.
  CRM: MSISDN. In addition, the following managing parameters may optionally be de-provisioned from the CRM: user information such as name, address, PUKs.
  OTA server: IMSI, OTA keys.

Said re-provisioning step further comprises reversing the redirecting step 24 applied during the preparation process, by applying a redirecting back step. Said redirection back is performed so that any message, attachment requests included, emanating from said reactivated SIM card 4 is no longer redirected to the recycler node 1, but is redirected to the managing node 10 in charge of said SIM card 4. Said redirection back is such that any message directed to said SIM card 4 is no longer redirected to the recycler node 1, but is redirected to the SIM card 4 or any intermediary node. For instance, any message directed to the SIM card 4 is now first routed to the relevant HLR/HSS instead of being route to the recycler node 1.

This is typically done by configuring back the routing nodes 16, by reverting back their routing tables 16' to their previous state, with the previous addresses they contained, before the SIM card 4 was turned inactive. One implementation could be, to have said routing tables 16', for the part related to said SIM card 4, included in said managing parameters 7, and thus backed up in the database 8, during the preparation process, and restored/re-provisioned back to the routing nodes during the reactivation process.

Another way to consider the reactivation process is to consider a new initialization is applied to the SIM card 4. The reception of a connection request emanating from an inactive SIM card 4 is followed by a processing applied by the recycler node 1, which can be compared to an initialization as if it was the first time said SIM card 4 connects to the cellular communication network 2, nonetheless a difference being that the IMSI used in this initialisation is the IMSI of a previously decommissioned SIM card. Another difference between the re-activation process of the invention and a conventional first activation relates to the optional user identification done through questions, the answers of which being already stored in managing nodes of the cellular communication network before the activation.

Since said SIM card 4 is now again in an ACTIVE state and its managing parameters 7 are available again to the relevant managing nodes 10 that may need them to manage a communication service for said SIM card 4, the recycler node 1 no longer needs to keep a copy of said managing parameters 7. Then during an optional but advantageous deletion step 27, that may be applied e.g. by deletion module 14, any backed up managing parameters 7 corresponding to said reactivated SIM card 4 can now be deleted out of the database 8. The SIM card 4 has now returned to the ACTIVE state, is managed by the relevant managing nodes 10 and is no longer known to the recycler node 1.

The reactivation process is in many ways, rather similar to the initialization process. Consequently some precautions can be taken before proceeding, to identify the inactive SIM card 4 candidate to reactivation and/or its user.

For this purpose, the recycler node 1 can further comprise an identification module 33 configured to apply an identification step 34. During said identification step 34 a dialog may be used to identify the SIM card 4 and/or its owner/subscriber. If the identification succeeds then the reactivation process can carry on, else the reactivation process is denied. Said dialog is intended to ask the holder of the terminal associated to the candidate SIM card 4 at least one question whose answer can indicate said holder is the legitimate owner/subscriber of said SIM card 4 that had previously undergone an entire identification process during its first activation and before it had been de-activated. Said dialog is typically applied through the man machine interface of said cellular terminal.

A first way to identify the owner of the SIM card 4 is to share with him/her a secret question whose answer is known to the cellular communication network 2. One way to do this is to record said answer 20 and possibly also said associated secret question, during the preparation process, when the SIM card 4 is about to be inactivated. This can be done, e.g. by the provisioning element 6 during the provisioning 22 step, and said answer 20, along with its associated secret question, can be stored in the database 8. The secret information stored in the network is referred to as the identification information.

The sharing of the secret question between the cellular communication network 2 and the user can be done through a dialog applied through the man machine interface of said terminal. Said sharing must be done at least before the SIM card 4 is turned INACTIVE. However, doing this when the SIM card 4 is about to be turned INACTIVE may not be the more practical, since at such a time, the SIM card 4 has not been used for a quarantine duration, and the user is probably not available. However, according to another embodiment, such a secret question may have been shared before, e.g. during initialization that is to say during the first activation of the SIM card 4. By doing so, said secret question, along with its answer 20, is already known from the cellular communication network 2 and available at the time of the preparation process when the SIM card 4 is turned into an INACTIVE state. The managing node 10 that stores that identification information can transmit it to the recycler node 1 for instance during the provisioning step of the recycler node 1.

Then, during the reactivation process, the identification module 33 can ask said secret question to the holder. The answer provided by the user during the re-activation is referred to as the identification data. If said holder answers correctly by providing said previously stored answer 20, then said holder can be considered to be the owner/subscriber of said SIM card 4 for which access to the cellular network had been once allowed before the de-activation. Typically, the identification is successful if the identification data entered by the user matches the identification information stored in the recycler node.

Another way to identify the owner/subscriber of the SIM card 4 is to ask him/her to provide the PIN code of said SIM card 4. Said PIN code is a secret code, supposed to be known only to the owner/subscriber. Said PIN code is present in the SIM card 4 and can be securely verified by the cellular communication network 2.

This both ways and others can be combined to provides a higher level of identification before the reactivation can be allowed and proceeded.

According to another embodiment, the recycler node 1 and the routing node 16 are both comprised in a single node. This single node, referred to as the recycler module thus has a routing component in charge of the routing of messages from/toward the SIM card. Therefore, according to this embodiment, the routing node having a capability to modify the routing is run inside the recycler module.

When the managing node (HLR/HSS for instance) is provisioned with the managing parameters (i.e., when the SIM card is considered as active), the routing node 16 of the recycler module receives all messages from the SIM card. The routing node of the recycler module can then route the messages to the managing node. Thus, the normal routing sends all messages (authentication and update location for instance) to the recycler module.

Upon de-provisioning of the managing node and provisioning of the recycler node (i.e., when the SIM card is de-activated), the routing node 16 of the recycler module routes the messages from the SIM card to the recycler node 1 which has been previously provisioned with the managing parameters.

Upon re-provisioning of the managing node (typically the HLR/HSS) (i.e., when the SIM card is re-activated), the recycler module modifies its routing component (routing node of the recycler module) in order to forward the messages to the managing node to complete the re-activation.

One advantage of this embodiment is that if the conventional routing nodes of the cellular communication network are not able to perform the modification of the routing as requested, in particular the modification of the routing table for a single given SIM card, this additional component included in the recycler module is able to do it.

Thus with this embodiment, it is easier to implement the invention in an existing cellular network wherein the routing nodes are not configured to allow modifying, in their routing table, the routing parameters for each SIM card individually.

FIGS. 6 to 9 provide another explanation of the above described embodiment.

Figure 6:
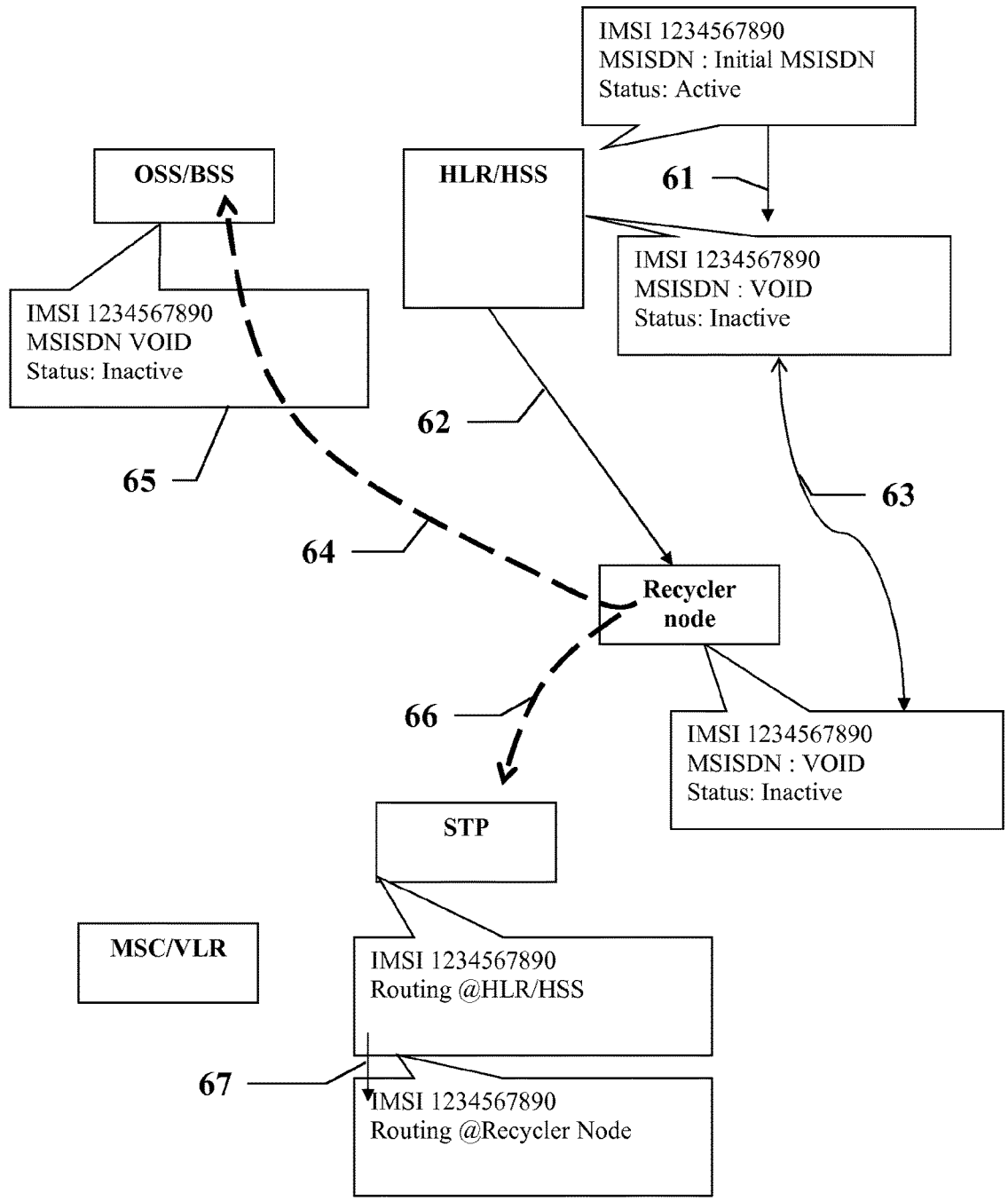
FIGS. 6 to 9 show some of the steps of a de-activation process and a re-activation process according to an embodiment of the invention in a system wherein the user can re-activate his SIM card from the cellular terminal associated embedding the SIM card and through the cellular communication system.

FIG. 6 illustrates the de-activation process of a SIM card which comprises the provisioning of recycler node 1 and the de-provisioning of the managing nodes.

When the operator detects an inactive SIM card, it decommissions the MSISDN from its network elements (HLR, AuC, CRM . . . ).

For instance, and as illustrated by reference sign 61 of FIG. 6, the database of HLR/HSS that previously associated the MSISDN to the IMSI of the SIM card 4, associates, upon decommissioning, the value VOID to the IMSI instead of the previous or initial MSISDN.

The HLR/HSS also provisions 62 a specific network element of the network, such as the recycler node 1 in charge of managing the inactive SIM cards. The database of the recycler node 1 also associates the unique identifier (typically the IMSI) of the SIM card 4 to the status INACTIVE, the value of the MSISDN being VOID.

Other managing nodes such as the OSS/BSS, CRM can also decommission 65 the MSISDN. This decommissioning 65 can be performed upon reception of an instruction from the HLR or from the recycler node 1 as illustrated by reference sign 64. Routing elements such as the STP can also decommission 67 the MSISDN upon reception of an instruction from the HLR or from the recycler node 1 as illustrated by reference sign 66.

It should be noted that the MSISDN is decommissioned from the STP and possibly from other routing nodes.

The recycler node 1 can thus recycle the MSISDN in the MSISDN pool.

During this step the routing address associated to the IMSI is modified 67 in the routing table of the routing node. The address of the HLR/HSS (@HLR/HSS) is replaced by the address of the recycler node (@Recycler Node) as depicted on FIG. 6.

As detailed below, the recycler node 1 is a logical element and all its functionalities can be performed by the physical HLR/HSS.

Figure 7:
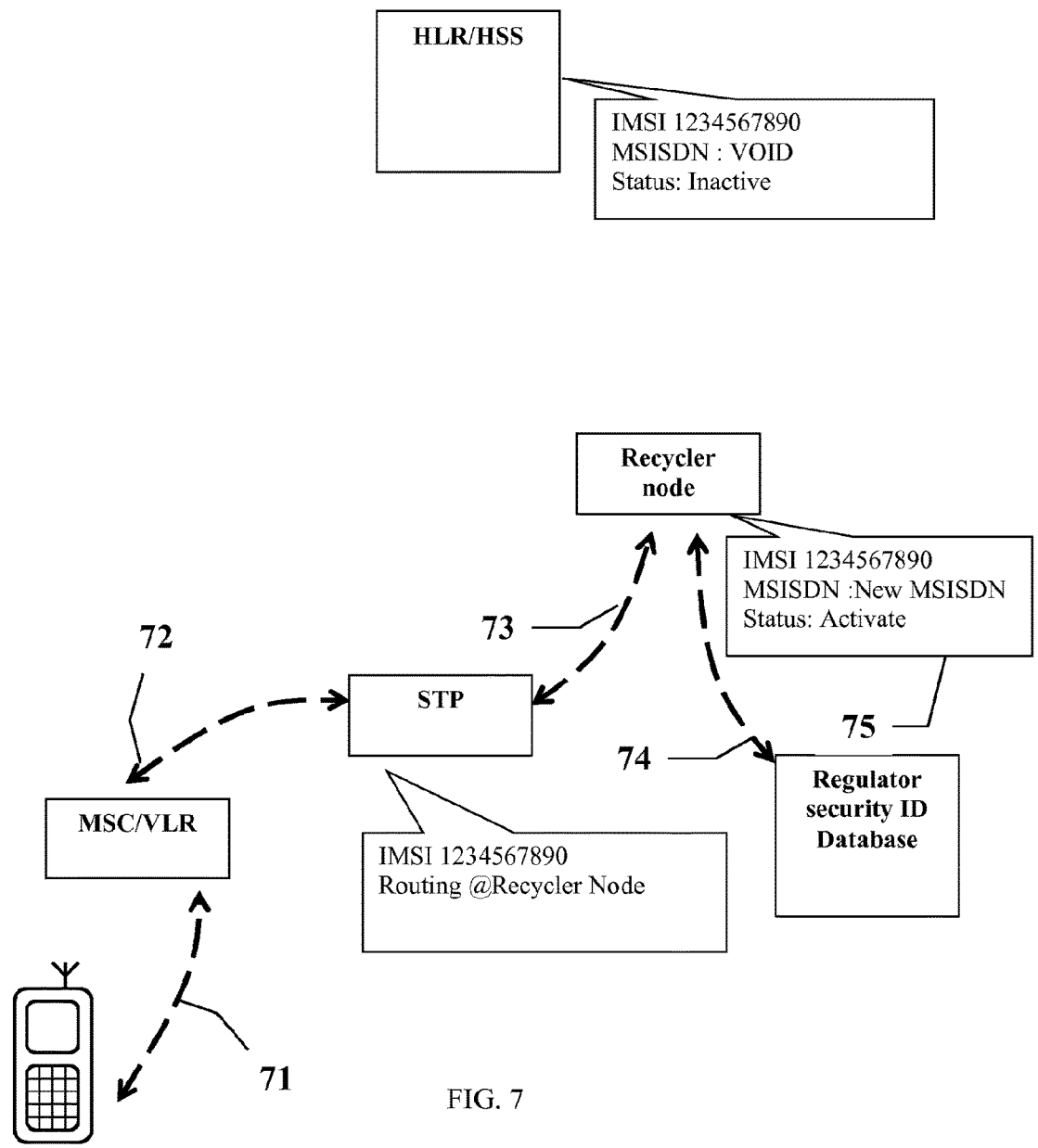
Figure 8:
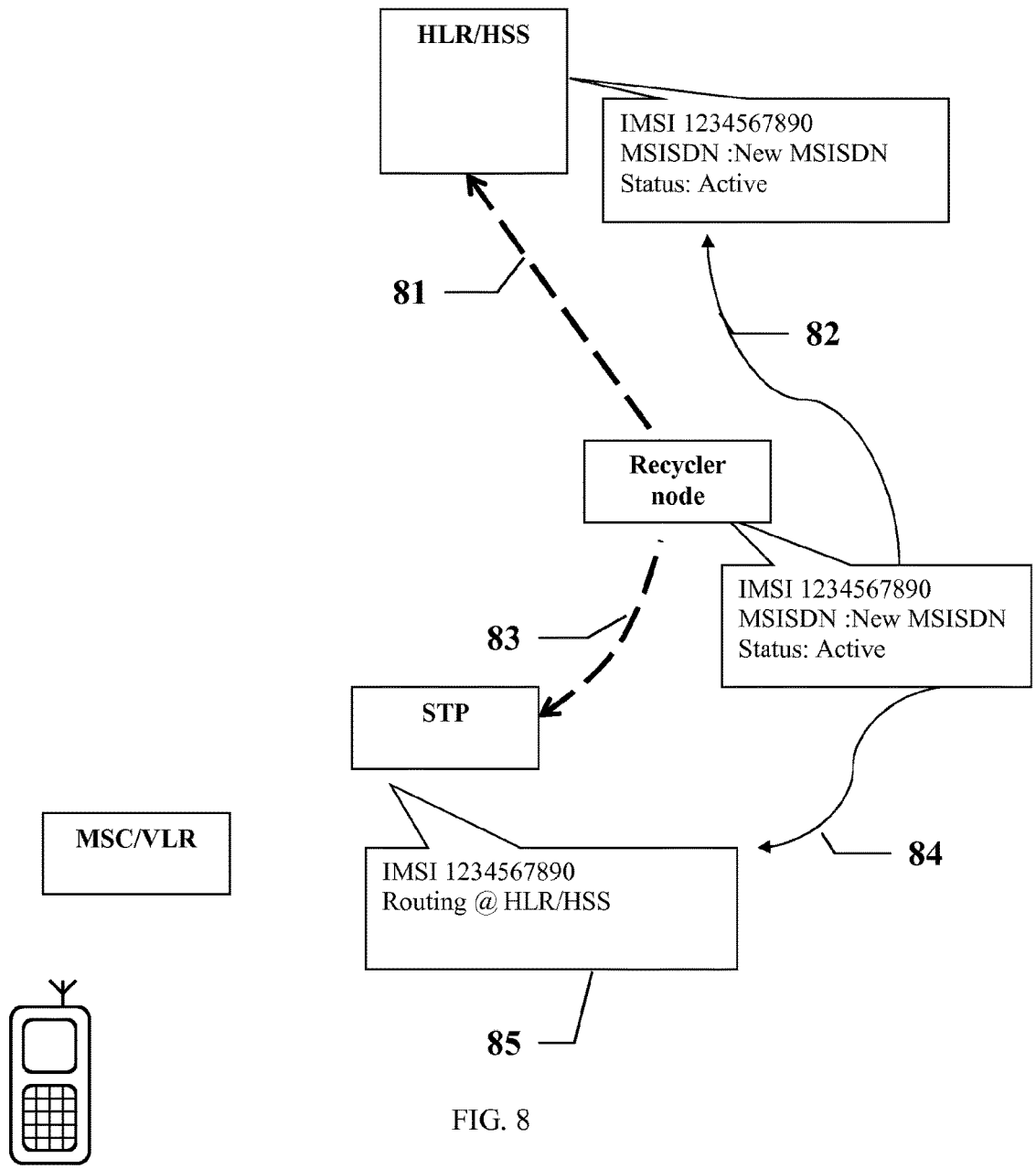

FIG. 7 depicts a re-activation process performed by the cellular communications network 2.

Once the SIM card is INACTIVE, whenever the subscriber attempts to re-attach the decommissioned SIM card 4 to the cellular communication network 2, for instance simply through inserting its decommissioned SIM card 4 into his cellular terminal, the network routes 71, 72, 73 signaling attachment messages to the recycler node.

Indeed, the routing elements 16 (STP for instance) have kept in their tables the address of the recycler node in association with the IMSI.

Then, all subsequent messages from the SIM card 4 are routed to the recycler node 1 until the SIM card is re-provisioned in the HLR/HSS. The messages from the recycler node can also be routed to the cellular terminal based on the IMSI.

Preferably, the recycler node 1 then sends to the subscriber a welcome message that prompts him to enter his PIN code and possibly additional identification data, such as his date of birth or the answer to a secret question in order to validate his identity.

The PIN code and/or possible identification data are then compared 74 to identification information previously stored in the network 2 and preferably stored in the recycler node 1. More generally, the identification information and PIN code can be previously stored by the operator as part of the identity registration procedure. In FIG. 7, the module in charge of performing the identification identity registration procedure is referred to as "regulator security ID".

If the identity verification succeeds, then a new MSISDN is assigned to the previously decommissioned SIM card 4. Preferably, the subscriber can choose the new MSISDN. Preferably, the element in charge of allocating a new MSISDN is the recycler node 1. According to another embodiment, another element, such as the HLR/HSS, can be in charge of allocating a new MSISDN.

The database of the recycler node 1 now associates 75 the unique identifier (typically the IMSI) of the SIM card 4 to the status ACTIVE, the value of the MSISDN being the new MSISDN "New MSISDN".

The recycler node is then in charge of re-provisioning the managing nodes of the cellular communication network. This step is depicted on FIG. 8.

The new MSISDN is for instance sent 81 to the HRL/HSS which in turn can modify its database. As shown by arrow 82, data contained in the database of the recycler node are now stored in the HLR/HSS's database. In particular, the database of the HLR/HSS now associates the unique identifier (typically the IMSI) of the SIM card 4 to the status ACTIVE, the value of the MSISDN being now the new MSISDN.

In addition, during this step of re-activation, the routing address associated to the IMSI is modified in the routing table of the routing node. The address of the recycler node is replaced 84 by the address of the HLR/HSS. Typically, the recycler node sends a message 83 to the routing node so that the routing address is changed.

Figure 9:
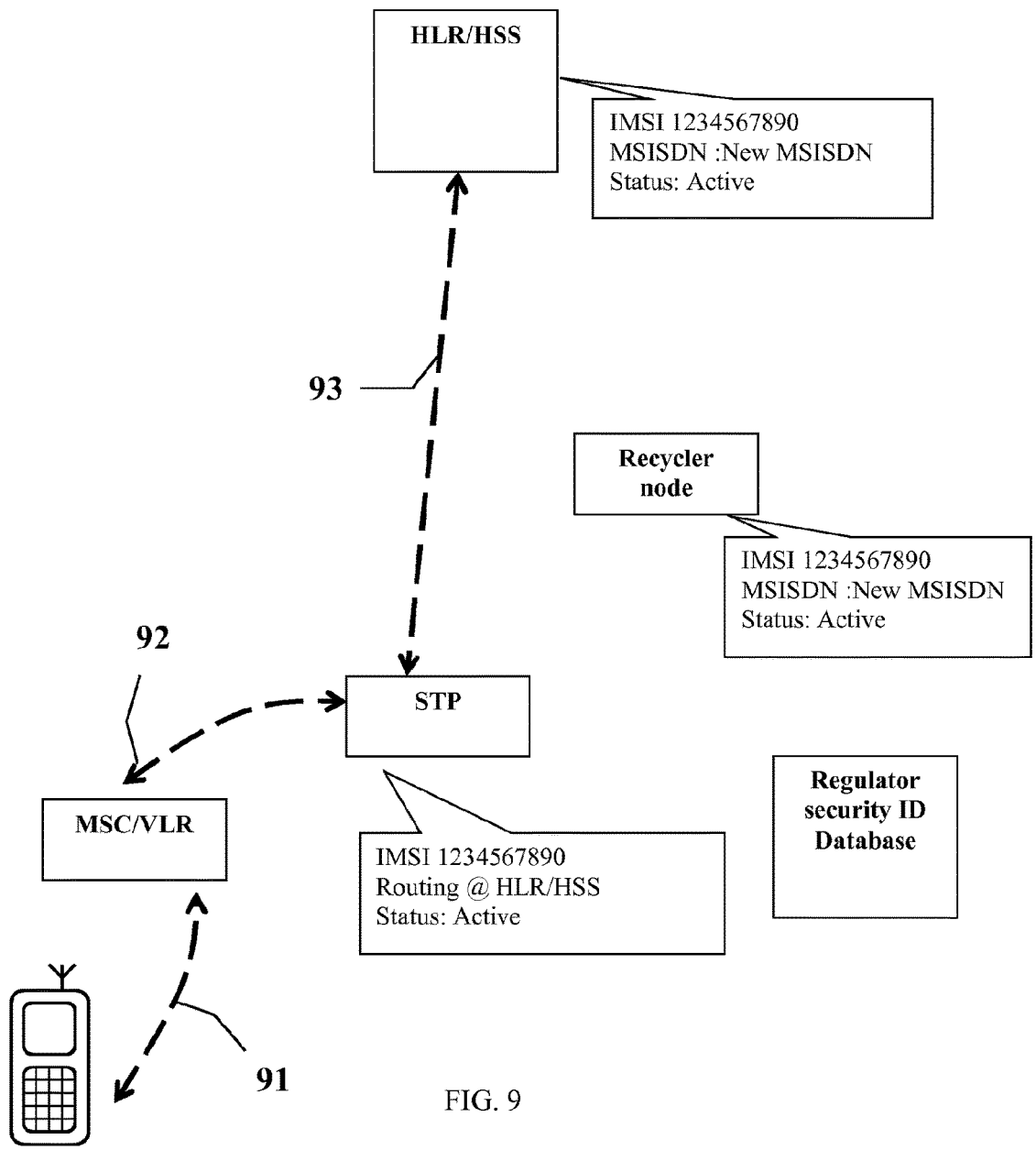

Then, as depicted in FIG. 9, the subsequent messages 91, 92, from the cellular terminal are routed 93 by the routing node to the HLR/HSS. The messages 93 from the cellular HLR/HSS are also routed 92, 91 by the routing node to the cellular terminal.

The messages will not anymore be routed to the recycler node.

They will be handled as any conventional message sent from an active SIM card.

The new MSISDN is also sent to other managing nodes such as the OSS/BSS, AuC, IN (intelligent network etc.) which in turn can modify their database and provision the new MSISDN.

Once this is done, the subscribers can use his cellular terminal with his old SIM card 4. The SIM card is therefore re-activated.

Figure 10:
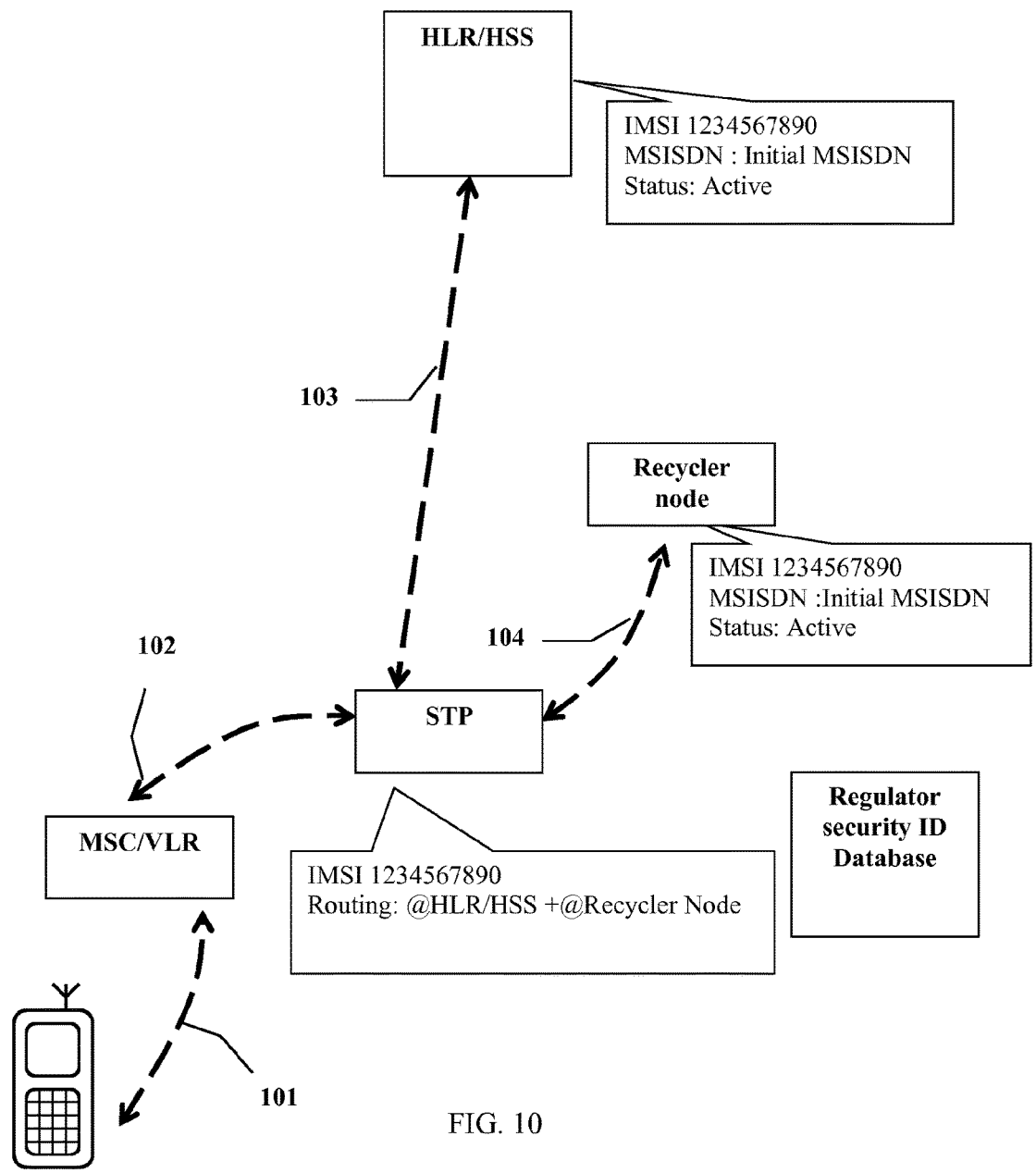
FIGS. 10 to 12 show some of the steps of a de-activation process and a re-activation process according to another embodiment of the invention.
Figure 11:
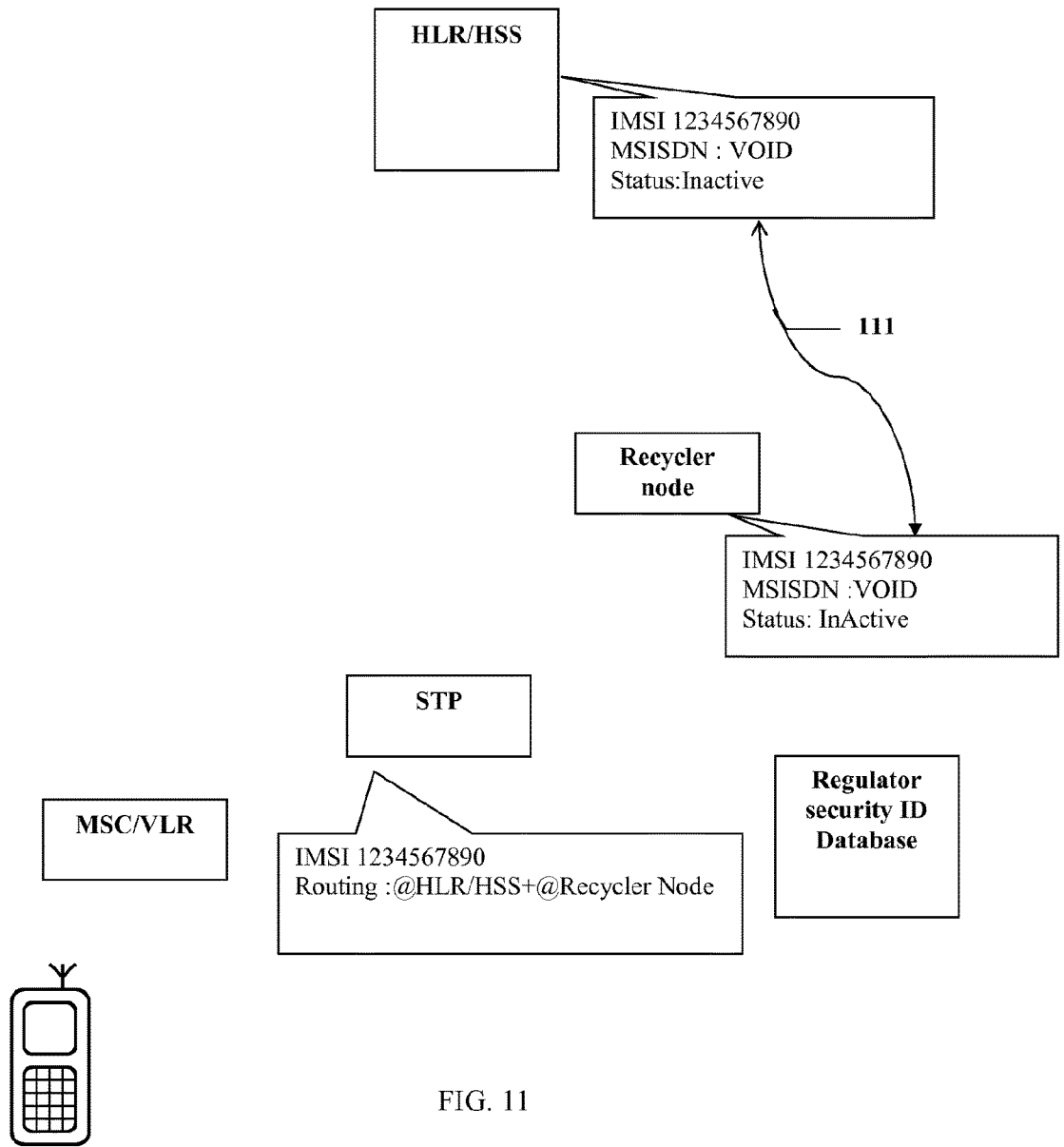
Figure 12:
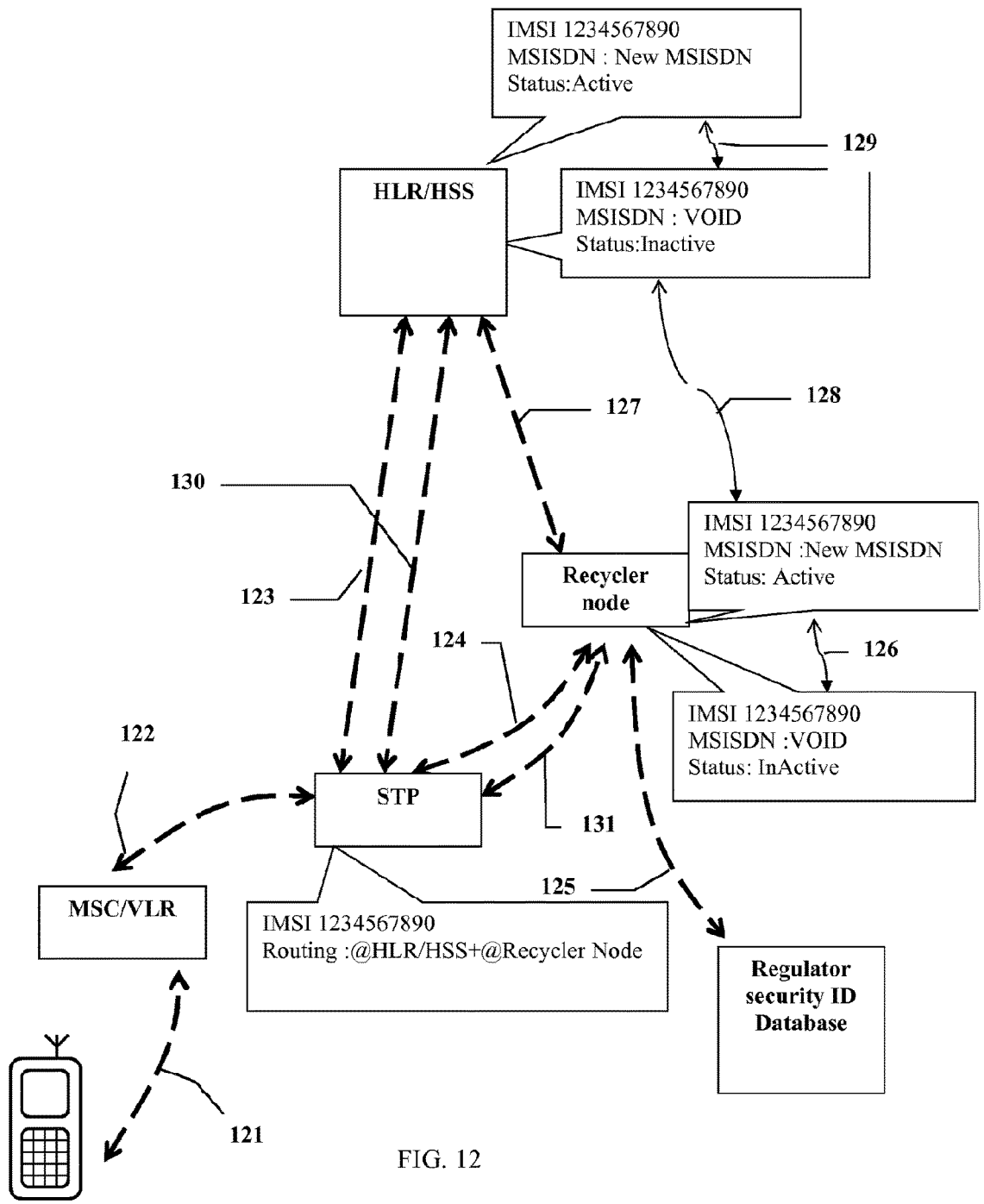

FIGS. 10 to 12 describe an alternative embodiment. Whereas in the previous embodiment, the routing table of the routing node is modified to redirect all the traffic between the SIM card and the recycler node until the HL/HSS is re-provisioned, in this alternative embodiment, the routing node sends duplicated messages to the recycler node in addition to the messages classically sent to the HLR/HSS. Therefore, the recycler node can handle the re-activation in manner that is totally non-intrusive to the operator.

All the features described above apply to the following embodiment.

FIG. 10 illustrates the flow of messages when the SIM card is active, for instance before any de-provisioning.

In a classical manner, all messages 101, 102 sent by the cellular terminal are routed toward 103 the HLR/HSS, the routing table of the routing node having stored the address of the HLR/HSS (@HLR/HSS) in association with the IMSI of the cellular terminal. In addition, all messages 103 from the HLR/HSS can also reach 102, 101 the cellular terminal.

The routing node, in addition to routing the messages from the cellular terminal to the HLR/HSS also routes 104 these messages to the recycler node.

Therefore the routing table of the routing node associates to the IMSI the two following addresses: @HLR/HSS and @Recycled Node. This is depicted in FIG. 10.

During all the phase, the recycler node is passive. The recycler node stores the status of the SIM card which is ACTIVE. Therefore, the recycler node does not modify the classical flow of messages. He only acts as a passive probe that "listens" to the traffic of the communication network.

In particular, the recycler node does not send any response when it receives the messages from an ACTIVE SIM card.

FIG. 11 illustrates the de-activation process of a SIM card which comprises the de-provisioning of the managing nodes.

When the operator detects an inactive SIM card, it decommissions the MSISDN from its network elements (HLR, AuC, CRM . . . ).

For instance, and as illustrated by reference sign 111 of FIG. 11, the database of HLR/HSS that previously associated the MSISDN to the IMSI of the SIM card, associates, upon decommissioning, the value VOID to the IMSI instead of the MSISDN.

According to the embodiment depicted on FIG. 10, the recycler node has been provisioned with the IMSI of the SIM card when receiving the messages from the routing node while the SIM card was still ACTIVE.

According to another embodiment, the HLR/HSS provisions the recycler node 1 in charge of managing the inactive SIM cards when the SIM card is detected as INACTIVE.

In these two embodiments, the status of the SIM card in the database of the recycler node 1 is switched to INACTVE. Thus the database of the recycler node 1 also associates the unique identifier (typically the IMSI) of the SIM card 4 to the status INACTIVE, the value of the MSISDN being VOID.

Other managing nodes such as the OSS/BSS, CRM can also decommission the MSISDN. This decommissioning can be performed upon reception of an instruction from the HLR or from the recycler node 1 as described with reference to the previous embodiment.

Routing elements such as the STP can also decommission the MSISDN upon reception of an instruction from the HLR or from the recycler node 1.

The MSISDN is decommissioned from the STP and possibly from other routing nodes. The recycler node 1 can thus recycle the MSISDN in the MSISDN pool.

It should be noted that although the MSISDN is decommissioned from the STP and possibly from other routing nodes, in the routing nodes the IMSI of the SIM card is still associated to the addresses @HLR/HSS and @Recycled Node.

Therefore, the messages from the SIM card 4 can still be routed to both the:
HLR/HSS. Since in the HLR/HSS the status of the corresponding IMSI is INACTIVE, then the HLR/HSS cannot process the message. He cannot attach the SIM card.
The recycler node.

As detailed below, the recycler node 1 is a logical element and all its functionalities can be performed by the physical HLR/HSS.

FIG. 12 depicts a re-activation process performed by the cellular communications network 2.

Once the SIM card is INACTIVE, whenever the subscriber attempts to re-attach the decommissioned SIM card 4 to the cellular communication network 2, for instance simply through inserting its decommissioned SIM card 4 into his cellular terminal, the network routes 121, 122 these messages to the routing node.

In response the routing node routes these messages (e.g. signaling attachment messages) to both the HLR/HSS 123 and the recycler node 124.

More particularly, the routing node routes to both the HLR/HSS and the recycler node at least the attachment request and preferably also the subscriber authentication messages and information. Preferably the routing node routes to both the HLR/HSS and the recycler node also the update location messages.

The recycler node knowns that the received message has been sent by an INACTIVE SIM card since this status is stored in the recycler node's database.

Then the recycler node knows that a re-activation procedure is requested by the user.

Therefore, the recycler node triggers the re-provisioning.

During this re-provisioning step, the messages from the recycler node can also be routed to the cellular terminal based on the IMSI.

Preferably, the recycler node 1 sends to the subscriber a welcome message that prompts him to enter his PIN code and possibly additional identification data, such as his date of birth or the answer to a secret question in order to validate his identity.

The PIN code and/or possible identification data are then compared 125 to identification information previously stored in the network and preferably stored in the recycler node. More generally, the identification information and PIN code can be previously stored by the operator as part of the identity registration procedure. In FIG. 12, the module in charge of performing the identification identity registration procedure is referred to as "regulator security ID".

If the identity verification succeeds, then a new MSISDN is assigned to the previously decommissioned SIM card. Preferably, the subscriber can choose the new MSISDN. Preferably, the element in charge of allocating a new MSISDN is the recycler node. According to another embodiment, another element, such as the HLR/HSS, can be in charge of allocating a new MSISDN.

The database of the recycler node now associates 126 the unique identifier (typically the IMSI) of the SIM card to the status ACTIVE, the value of the MSISDN being the new MSISDN "New MSISDN".

The recycler node is then in charge of re-provisioning 127 the managing nodes (HLR/HSS for instance) of the cellular communication network. This step is depicted on FIG. 12.

The new MSISDN is for instance sent to the HRL/HSS which in turn can modify its database. As shown by arrow 128, data contained in the database of the recycler node are now stored in the HLR/HSS's database. In particular, the database of the HLR/HSS now associates 129 the unique identifier (typically the IMSI) of the SIM card 4 to the status ACTIVE, the value of the MSISDN being now the new MSISDN.

During this step of re-activation, the routing addresses associated to the IMSI in the routing node are still the addresses of the recycler node and of the HLR/HSS.

Then the subsequent messages 121, 122 from the cellular terminal will be routed 130 by the routing node to the HLR/HSS. The messages 130 from the cellular HLR/HSS will be routed 122, 121 by the routing node to the cellular terminal.

The recycler node will thus act again as a passive probe that receives the messages of the ACTIVE SIM card without interfering on the classical traffic.

In particular, the recycler node does not send any response when it receives the messages from the ACTIVE SIM card. The recycler node is active only during the re-provisioning and turns again passive when the re-provisioning is completed.

These messages will be handled as any conventional message sent from an active SIM card, excepted that they will be duplicated to be sent to the recycler node.

The new MSISDN is also sent to other managing nodes such as the OSS/BSS, AuC, IN (intelligent network etc.) which in turn can modify their database and provision the new MSISDN.

Once this is done, the subscribers can use his cellular terminal with his old SIM card 4. The SIM card is therefore re-activated.

The advantage of this embodiment depicted on FIGS. 10-12 is that the invention does not modify the classical processing between the routing node, typically the STP, and the HLR/HSS. In addition the HLR/HSS goes on receiving all messages from the cellular terminal even when the HLR/HSS has been deprovisioned and cannot process such messages. This functioning of the HLR/HSS is similar to the classical process.

Therefore thanks to the invention the operator does not have to modify the functioning of the HLR/HSS nor the maintenance procedures related to this component. Yet, the HLR/HSS is a major component of a network and is highly sensitive.

The invention can therefore be deployed and implemented very rapidly and without significant modifications of the current communication network.

In addition, the routing node does not have to modify its routing table at the various steps of the de-provisioning and re-provisioning of the network. The routing node only has to have the capability to send the messages from the cellular terminal to both the HLR/HSS and the recycler node.

Therefore this embodiment allows a very stable traffic. This solution is very reliable.

During all the steps, excepted the re-provisioning step, the recycler node is a passive element that does not modify the classical flow of messages and that only acts as a passive probe, that listens to the messages sent through the communication network.

It should be noted that a single system can be configured to support the two alternative embodiments described in reference to FIGS. 6-9 and 10-12.

The recycler module can be composed of a single hardware unit or can be composed of a plurality of hardware units.

Figure 13:
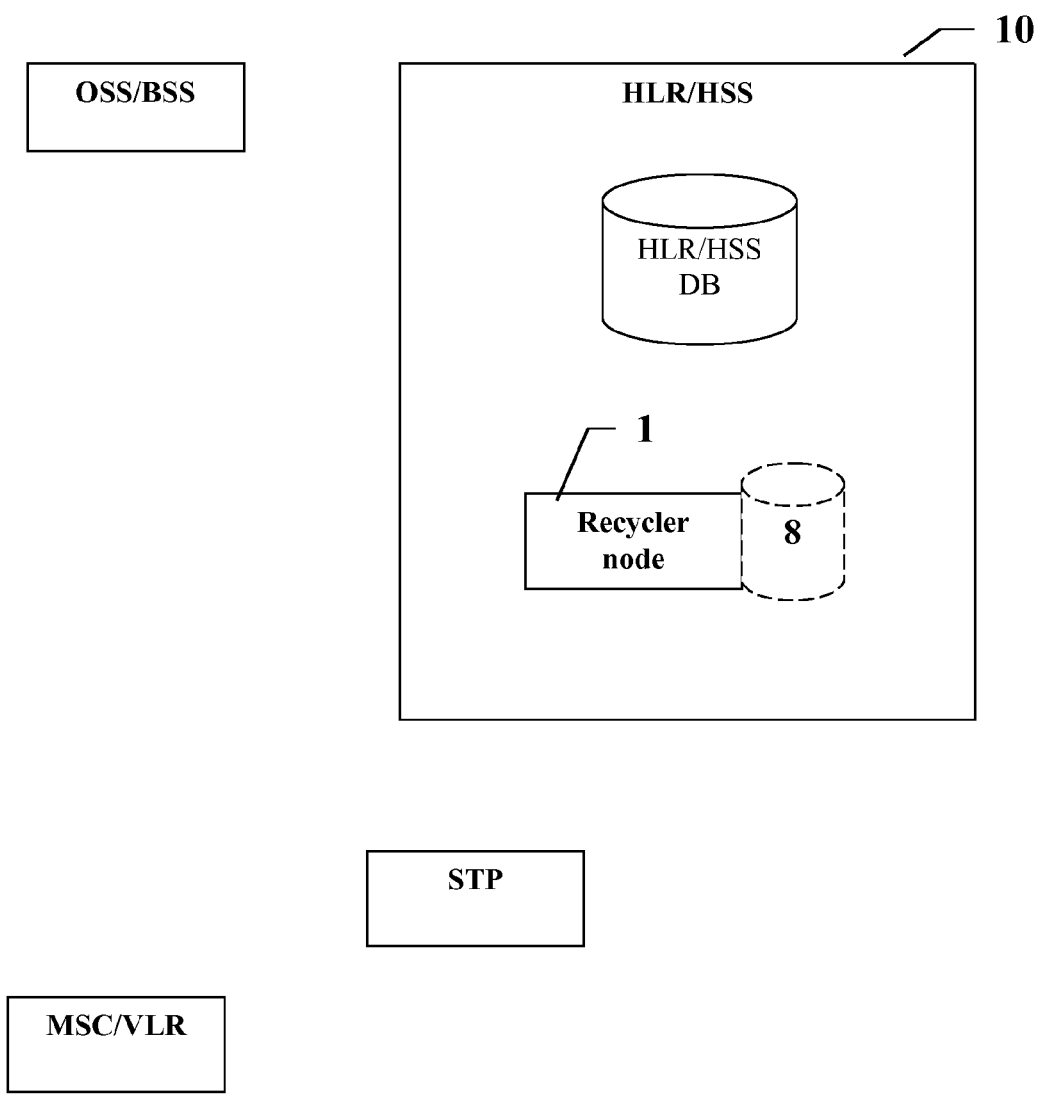
FIG. 13 illustrates an embodiment wherein the recycler node is a part of the HLR/HSS.

Whatever is the composition of the recycler node 1 this node can be an independent node of the cellular communication network 2 or it can alternatively and advantageously be formed by or be part of or be embedded in the HLR/HSS. FIG. 13 illustrates an embodiment wherein all functionalities of the recycler node are played by the HLR/HSS. Therefore, the recycler node 1 is a logical element and all its functionalities and steps described in the present description as being performed by the recycler node are may be performed by the HLR/HSS incorporating the recycler node.

From the above description, it appears clearly that the invention provides many advantages. Indeed, the SIM card 4 can be re-activated while ensuring that the current holder of the SIM card 4 is actually the subscriber for which access to the network had been granted previously to the de-activation. Thus, the longue and tedious identification process that is mandatory at the first activation of the SIM card 4 does not need to be performed again. The operator, the official agency and the customer save a lot of time and money.

In addition the customer is more prone to go back to its previous operator.

A further advantage is that the de-activated SIM card are not wasted and can be used again which is environment friendly and is money saving for the operator.

While there is shown and described the present preferred embodiment of the invention, it is to be distinctly understood that this invention is not limited thereto but may be variously embodied to practice within the scope of the following claims.

Although the various elements of the recycler node have been depicted on FIG. 4 as pertaining to the same node, the description shall not be construed as describing a physical node performing all the processes described in relation to FIG. 4. Indeed, the invention encompasses all embodiments where various and possibly independent modules are in charge of performing the processes of FIG. 4.

The invention claimed is:

1. A method in a cellular communication network comprising at least a home location register/home subscriber server (HLR/HSS) that stores managing parameters related to a SIM card associated to a cellular terminal configured to be connected to the network, said managing parameters comprising at least an International Mobile Subscriber Identifier (IMSI), and at least a routing node configured to route requests between the cellular terminal and the HLR/HSS, wherein:

the method comprises at least a step of provisioning a recycler node which comprises backing up in at least a data base of said recycler node said managing parameters comprising said IMSI, the step of provisioning the recycler node being performed when said SIM card has not been used for at least a quarantine duration;

when said SIM card that stores said IMSI has not been used for at least a quarantine duration the method performs the following steps:

de-provisioning at least the HLR/HSS by removing from the HLR/HSS an identifier of a subscription (MSISDN) associated to the SIM card and said IMSI; wherein upon de-provisioning at least the HLR/HSS, the method comprising recycling the MSISDN of said SIM card in a phone number pool;

wherein the method also comprises the following steps performed when said SIM card has not been used for at least the quarantine duration;

sending any attachment request emanating from said SIM card to the recycler node, which comprises associating, in routing tables of the routing node, the IMSI of said inactive SIM card with an address of said recycler node;

after the provisioning of the recycler node, after the de-provisioning of at least the HLR/HSS and upon reception at the recycler node of an attachment request emanating from said SIM card, the method comprises reactivating the SIM card through performing the following step:

verifying an identity of a user of the SIM card which comprises identifying the user based on identification data previously received from the user of the SIM card and on identification information stored in the recycler node, the identification data being different from said IMSI, the identification information comprising an answer to a secret question;
and only if the step of identifying is successful, then:
re-provisioning at least the HLR/HSS by associating in the HLR/HSS the set of managing parameters related to said reactivated SIM card restored from a database with a new identifier of a subscription (new MSISDN), the set of managing parameters comprising said IMSI.

2. Method according to claim 1 wherein during the identification step, the identification data is entered by the user through a man machine interface of the cellular terminal.

3. Method according to claim 1 wherein the identifier of a subscription associated to the SIM card is a Mobile Station Integrated Services Digital Network Number (MSISDN).

4. Method according to claim 1 wherein the step of de-provisioning the HLR/HSS is performed after a successful completion of the step of provisioning the recycler node.

5. Method according to claim 1 wherein the step of de-provisioning at least the HLR/HSS comprising comprises removing from the HLR/HSS said IMSI.

6. Method according to claim 1 wherein the step of re-provisioning at least the HLR/HSS comprises providing back the HLR/HSS with the set of managing parameters related to said reactivated SIM card restored from the database in association with a new identifier of a subscription (new MSISDN), the set of managing parameters comprising said IMSI.

7. Method according to claims claim 1 wherein the step of sending any attachment request emanating from said SIM card to the recycler node comprises modifying at least a routing table of the routing node so that the routing node redirects any attachment request emanating from said SIM card to the recycler node.

8. Method according to claim 7 wherein the step of modifying at least the routing table of the routing node is performed so that the routing node does not redirect any attachment request emanating from said SIM card to HLR/HSS.

9. Method according to claim 7 wherein the step of reactivating the SIM card, also comprises modifying at least the routing table of the routing node so that the routing node redirects any message emanating from said SIM card to the HLR/HSS based on said IMSI.

10. Method according to claim 9 wherein the step of reactivating the SIM card, also comprises modifying at least the routing table of the routing node so that the routing node does not redirect any more the message emanating from said SIM card to the recycler node.

11. Method according to claim 1 wherein the step of provisioning the recycler node with the IMSI is performed before said SIM card has not been used for at least a quarantine duration.

12. Method according to claim 1 wherein after said SIM card has not been used for at least a quarantine duration the recycler node is provisioned with the new identifier of a subscription (New MSISDN).

13. Method according to claim 1 wherein the step of sending any attachment request emanating from said SIM card to the recycler node comprises: the routing node redirects any attachment request emanating from said SIM card to the recycler node and to the HLR/HSS.

14. Method according to claim 13 wherein the routing node duplicates any attachment request emanating from said SIM card and send it to both the recycler node and the HLR/HSS.

15. Method according to claim 13 wherein sending any attachment request emanating from said SIM card to the recycler node, comprises associating, in the routing tables of the routing node, the IMSI of said inactive SIM card with an address of said recycler node and with an address of the HLR/HSS.

16. Method according to claim 13 wherein the step of de-provisioning at least the HLR/HSS comprises keeping in the HLR/HSS said IMSI related to said SIM card.

17. Computer-program product stored on a non-transitory computer readable medium that contains software program instructions, where execution of the software program instructions by at least one data processor results in performance of operations that comprise execution of at least the following steps:
identifying that a SIM card that stores at least an International Mobile Subscriber Identifier (IMSI) and an identifier of a subscription (MSISDN) has not been used for at least a quarantine duration, then:
provisioning a recycler node which comprises backing up in at least a database stored in at least a data storage device of said recycler node: managing parameters comprising at least an International Mobile Subscriber Identifier (IMSI), the step of provisioning the recycler node being performed when said SIM card has not been used for at least a quarantine duration;
recycling the MSISDN of said SIM card in a phone number pool;
sending an instruction to modify at least a routing table of a routing node so that the routing node can redirect any attachment request emanating from said SIM card to the recycler node;
after the provisioning of the recycler node, and upon reception of an attachment request emanating from said SIM card performing the following steps:
verifying the identity of a user of the SIM card which comprises identifying the user based on identification data previously received from the user of the SIM card and on identification information stored in the recycler node, the identification data being different from said IMSI, the identification information comprising an answer to a secret question;
and only if the step of identifying is successful, then allocating a new identifier of a subscription (new MSISDN);
providing to a managing node the set of managing parameters related to said reactivated SIM card restored from the database in association with the new (new MSISDN), the set of managing parameters comprising said IMSI; and
sending an instruction to modify at least the routing table of the routing node so that the routing node redirects any message emanating from said SIM card to said managing node.

18. Recycler node configured to be connected in a cellular communication network comprising at least a managing node that stores managing parameters related to a SIM card associated to a cellular terminal configured to be connected to the network and at least a routing node configured to route requests between the cellular terminal and the managing node, said managing parameters comprising at least an International Mobile Subscriber Identifier (IMSI) and an identifier of a subscription (MSISDN), wherein:
the recycler node is configured to execute the following steps when said SIM card has not been used for at least a quarantine duration:

provisioning a database of the recycler node which comprises backing up in at least a database stored in at least a data storage device of said recycler node: managing parameters comprising at least said IMSI the step of provisioning the recycler node being performed when said SIM card has not been used for at least a quarantine duration;
recycling the MSISDN of said SIM card in a phone number pool;
sending an instruction to modify at least a routing table of the routing node so that the routing node can redirect any attachment request emanating from said SIM card to the recycler node;
and characterized in that wherein the recycler node is configured to execute the following steps after the provisioning of the recycler node, and upon reception of an attachment request emanating from said SIM card:
verifying the identity of a user of the SIM card which comprises identifying the user based on identification data previously received from the user of the SIM card and on identification information stored in the recycler node, the identification data being different from said IMSI, the identification information comprising an answer to a secret question;
and only if the step of identifying is successful, then
allocating a new identifier of a subscription (new MSISDN);
providing to a managing node at least said IMSI related to said reactivated SIM card restored from the database in association with a new identifier of a subscription (new MSISDN); and
sending an instruction to modify at least the routing table of the routing node so that the routing node redirects any message emanating from said SIM card to said managing node.

19. System for a cellular communication network comprising:
at least a managing node that stores managing parameters related to a SIM card associated to a cellular terminal configured to be connected to the network, said managing parameters comprising at least an International Mobile Subscriber Identifier (IMSI):
at least a routing node configured to route requests between the cellular terminal and the managing node; and
at least a recycler node according to claim 18.

20. System for a cellular communication network comprising:
at least a managing node that stores managing parameters related to a SIM card associated to a cellular terminal configured to be connected to the network, said managing parameters comprising at least an International Mobile Subscriber Identifier (IMSI):
at least a routing node configured to route requests between the cellular terminal and the managing node; and
at least a recycler node according to claim 18.

21. A method in a cellular communication network comprising at least a home location register/home subscriber server (HLR/HSS) that stores managing parameters related to a SIM card associated to a cellular terminal configured to be connected to the network, said managing parameters comprising at least an International Mobile Subscriber Identifier (IMSI), and at least a routing node configured to route requests between the cellular terminal and the HLR/HSS, wherein:
the method comprises at least a step of provisioning a recycler node which comprises backing up in at least a database of said recycler node said managing parameters comprising said IMSI,
when said SIM card that stores said IMSI has not been used for at least a quarantine duration the method performs the following steps:
de-provisioning at least the HLR/HSS by removing from the HLR/HSS an identifier of a subscription (MSISDN) associated to the SIM card and said IMSI; wherein upon de-provisioning at least the HLR/HSS, the method comprising recycling the MSISDN of said SIM card in a phone number pool,
wherein the method also comprises the following steps performed when said SIM card has not been used for at least the quarantine duration:
sending any attachment request emanating from said SIM card to the recycler node, which comprises modifying at least a routing table of the routing node in order to associate, in the routing tables of the routing node, said IMSI of said inactive SIM card with an address of said recycler node so that the routing node redirects any attachment request emanating from said SIM card to the recycler node;
after the provisioning of the recycler node, after the de-provisioning of at least the HLR/HSS and upon reception at the recycler node of an attachment request emanating from said SIM card, the method comprises reactivating the SIM card through performing the following steps:
verifying an identity of a user of the SIM card which comprises identifying the user based on identification data previously received from the user of the SIM card and on identification information stored in the recycler node, the identification data being different from said IMSI, the identification information comprising an answer to a secret question;
and only if the step of identifying is successful, then:
re-provisioning at least the HLR/HSS by associating in the HLR/HSS the set of managing parameters related to said reactivated SIM card restored from the database with a new identifier of a subscription (new MSISDN), the set of managing parameters comprising said IMSI.

22. Method according to claim 21 wherein the step of modifying at least the routing table of the routing node is performed so that the routing node does not redirect any attachment request emanating from said SIM card to HLR/HSS.

23. Method according to claim 21 wherein the step of reactivating the SIM card, also comprises modifying at least the routing table of the routing node so that the routing node redirects any message emanating from said SIM card to the HLR/HSS based on said IMSI.

24. Method according to claim 23 wherein the step of reactivating the SIM card, also comprises modifying at least the routing table of the routing node so that the routing node does not redirect any more the message emanating from said SIM card to the recycler node.

25. Method according to claim 21 wherein the step of de-provisioning at least the HLR/HSS comprises removing from the HLR/HSS all the managing parameters related to said SIM card.

26. Method according to claim 21 wherein the HLR/HSS detects that the SIM card has not been used for at least a quarantine duration and then:

sends to the recycler node an instruction to perform to the step of provisioning the recycler node; and performs the de-provisioning step.

27. Method according to claim 21 wherein after provisioning the recycler node and before re-provisioning at least the HLR/HSS, the routing node redirects any transmission sent by the inactive SIM card to the recycler node based on said IMSI of the SIM card and wherein the recycler node and the routing node are both comprised in a single module.

28. Method according to claim 21 wherein before the quarantine duration has elapsed without the SIM card being used, at least one managing node of the cellular communication network taken among any one of: an authentication center (AuC), a customer relationship management (CRM), an operation support system (OSS) and a business support system (BSS), stores at least one identifier taken among the IMSI and the identifier of a subscription (MSISDN);

and wherein after the quarantine duration has elapsed without the SIM card being used:
de-provisioning said at least one managing node by removing from said at least one managing node said at least one identifier taken among the IMSI and the identifier of a subscription (MSISDN).

29. Method according to claim 28 wherein de-provisioning said at least one managing node comprises removing from said at least one managing node all the data related to the SIM card.

30. Method according to claim 28 wherein after allocating a new identifier of a subscription to the SIM card, the method comprises the step of:
re-provisioning said at least one managing node by providing said at least one managing node with managing parameters related to said reactivated SIM card restored from the database.

* * * * *